(12) United States Patent
Wang

(10) Patent No.: US 6,496,198 B1
(45) Date of Patent: Dec. 17, 2002

(54) COLOR EDITING SYSTEM

(75) Inventor: Shin-Ywan Wang, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/304,687

(22) Filed: May 4, 1999

(51) Int. Cl.[7] .......................... G09G 5/00; G06F 15/00; G06K 9/36
(52) U.S. Cl. ........................ 345/629; 707/514; 382/284
(58) Field of Search ................................ 345/433, 435, 345/629, 630; 707/514; 382/284

(56) References Cited

U.S. PATENT DOCUMENTS

| | | | |
|---|---|---|---|
| 5,128,748 A | | 7/1992 | Murakami et al. ............ 358/75 |
| 5,155,594 A | | 10/1992 | Bernstein et al. ........... 358/136 |
| 5,159,443 A | | 10/1992 | Ando ........................... 358/75 |
| 5,444,489 A | | 8/1995 | Truong et al. ............... 348/422 |
| 5,485,568 A | * | 1/1996 | Venable et al. ............. 707/500 |
| 5,576,849 A | | 11/1996 | Murakami et al. .......... 358/450 |
| 5,588,072 A | | 12/1996 | Wang ........................... 382/176 |
| 5,680,479 A | | 10/1997 | Wang et al. ................. 382/176 |
| 5,751,852 A | * | 5/1998 | Marimont et al. .......... 382/180 |
| 5,761,342 A | | 6/1998 | Yoshida ....................... 382/234 |
| 5,774,579 A | | 6/1998 | Wang et al. ................. 382/176 |
| 5,796,876 A | | 8/1998 | Wang et al. ................. 382/270 |
| 5,798,752 A | * | 8/1998 | Buxton et al. ............... 345/157 |
| 5,825,944 A | | 10/1998 | Wang .......................... 382/309 |
| 5,841,899 A | | 11/1998 | Ide et al. ..................... 382/168 |
| 5,848,185 A | * | 12/1998 | Koga et al. .................. 382/173 |
| 5,848,186 A | | 12/1998 | Wang et al. ................. 382/176 |
| 5,977,977 A | * | 11/1999 | Kajiya et al. ................ 345/418 |
| 5,982,350 A | * | 11/1999 | Hekmatpour et al. ....... 345/473 |
| 6,014,147 A | * | 1/2000 | Politis et al. ................ 345/522 |
| 6,141,012 A | * | 10/2000 | Bollman et al. ............. 345/418 |
| 6,175,663 B1 | * | 1/2001 | Huang ......................... 382/284 |

* cited by examiner

Primary Examiner—Michael Razavi
Assistant Examiner—Ryan Yang
(74) Attorney, Agent, or Firm—Fitzpatrick, Cella, Harper & Scinto

(57) ABSTRACT

A system to render a color image using a binarized image representing the color image and a hierarchical tree structure representing the color image, the hierarchical tree structure including nodes representing respective blocks of image data within the color image, the nodes containing color information for respective blocks. The system includes a defining step to define, in a memory, a color image rendering area corresponding to a block of image data in the color image, an obtaining step to obtain foreground color information from a node corresponding to the block of image data, a detecting step to detect black pixel locations in the binarized image within an area of the binarized image corresponding to the block of image data, and an assigning step to assign the foreground color to pixels at locations in the color image rendering area corresponding to the detected black pixel locations.

10 Claims, 36 Drawing Sheets

Canon

Canon Information Systems, Inc.
Technical Information Center Newsletter
Published by Joyce Peluso
April 27, 1992, Volume 2, No. 4-4

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:

(1) Purely capitalistic enterprises that exploit their workers for profit.

(2) Those where management and labor work closely together to maximize profits, but don't pay enough attention to the community (3) A company that both tries to make money but also seeks to fulfill its corporate responsibilities to society, but in a small scale way to a particular country or region.

(4) A highly evolved type of company that contributes positively to world prosperity.

Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Ryuzaburo Kaka, Chairman of the Board of Cano, Inc. continued to say about the four companies. Canon Company ..This is a company practicing good corporate and civic policies, a company concerened about it s employoees and shareholders.

Fig 1: Mr. Hideharu Takemoto

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.

Mr. Takemoto wants to create a new Canon corporate culture, "The best of American and Japanese cultures must be blended to produce a richer corporate alchemy--a new ideal."

Canon wants to create more jobs for Americans in the 1990s and to make them an integral part of the Canon family. Mr. Takemoto is further committed to cultivating local talent and moving local executives up through the ranks of Canon's highest corporate echelons.

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

Ink-Jet Printer Market Share

Source: Computer Reseller News/Info Corp

| SelectedInk-Jetprinters | March | April | May | June |
|---|---|---|---|---|
| AppleStylewriter | 17.5% | 26.7% | 41.5% | 31.5% |
| H-P | | | | |
| PaintJet | <1% | 2% | <1% | <1% |
| DeskJet500 | 49% | 39% | 31.6% | 24.6% |
| DeskWriter | 31% | 27.3% | 20.4% | 14.9% |
| H-P | | | | |
| BJ10E | <1% | 3.4% | 4.3% | 7.9% |
| BJ300/330 | <1% | <1% | <1% | <1% |

Canon Information Systems, Inc.                                    Page 1

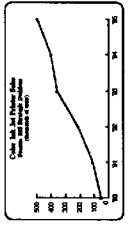
FIG. 11

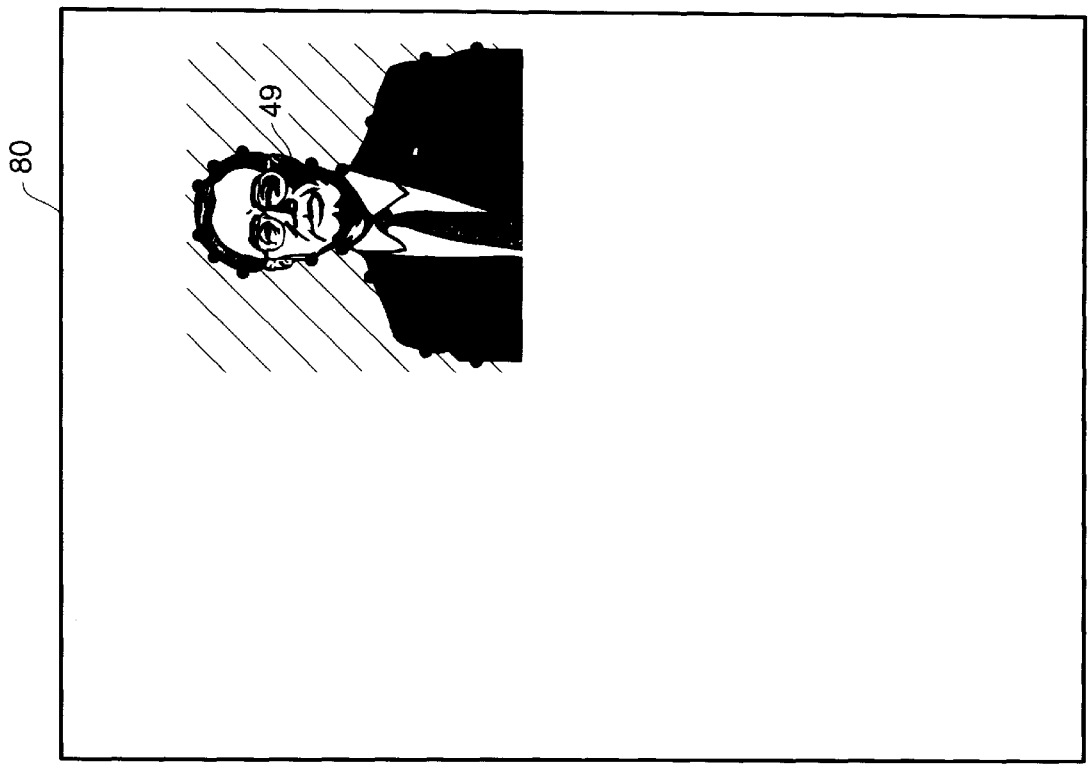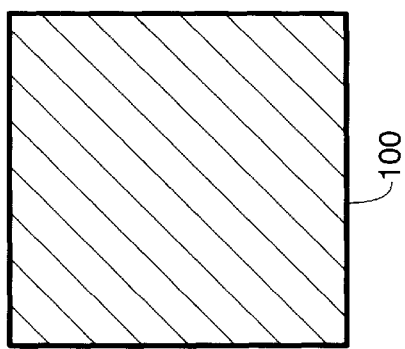
FIG. 21

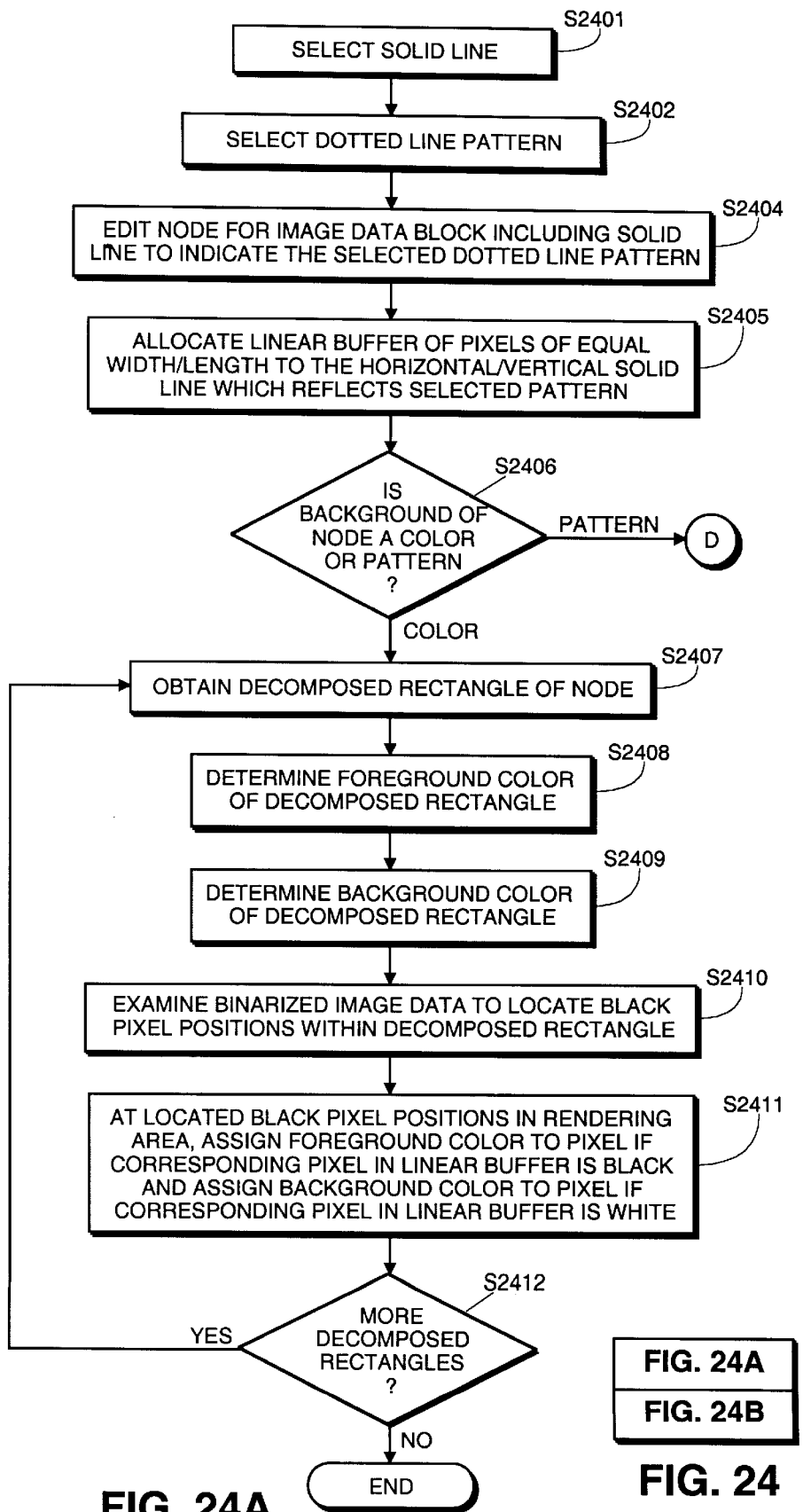

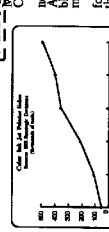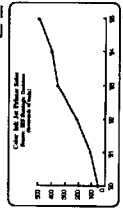
FIG. 29

COLOR EDITING SYSTEM

BACKGROUND OF THE INVENTION

Field of the Invention

The present invention concerns a system for rendering and editing color images. In particular, the present invention relates to a system in which colored regions of a color image are rendered and edited using a binarized version of the image and a hierarchical representation of blocks of color image data within the color image.

INCORPORATION BY REFERENCE

Commonly-assigned U.S. applications Ser. No. 07/873,012, now U.S. Pat. No. 5,680,479, entitled "Method and Apparatus For Character Recognition", Ser. No. 08/171,720, now U.S. Pat. No. 5,588,072, entitled "Method and Apparatus For Selecting Text And/Or Non-Text Blocks In A Stored Document", Ser. No. 08/338,781, entitled "Page Analysis System", Ser. No. 08/514,250, now U.S. Pat. No. 5,774,579, entitled "Block Selection System In Which Overlapping Blocks Are. Decomposed", Ser. No. 08/514,252, now U.S. Pat. No. 5,848,186, entitled "Feature Extraction System", Ser. No. 08/664,674, entitled "System For Extracting Attached Text", Ser. No. 08/751,677, entitled "Page Analysis System", Ser. No. 08/834,856, now U.S. Pat. No. 5,825,944, entitled "Block Selection Review and Editing System", Ser. No. 09/002,684, entitled "System For Analyzing Table Images", and Ser. No. 09/161,716, entitled "Color Block Selection", are herein incorporated as if set forth in full.

DESCRIPTION OF THE RELATED ART

Conventional color image editing systems can be used to display an image, to select an area of the displayed image and to perform some type of editing or filtering function upon the selected area. Common editing functions include color change, rotate, resize, enhance, or blur. Such functions are adequate for certain purposes, but cannot easily be used to edit foreground and background colors in color images.

In this regard, such functions do not distinguish between various types of image data which may exist within a selected area of a color image. Therefore, in the case of document images, a background color of a selected region of text cannot be easily altered without also altering the color of pixels composing the text. For example, in a case that a user selects a text area of a document image and then chooses a blue color change function, the color of each pixel in the selected area will be changed to blue, thereby obliterating any distinction between the text pixels and the background pixels.

Of course, conventional editing systems could be used to alter background colors of a selected area by individually selecting and changing the color of each background pixel surrounding text pixels in the selected area. This process is, however, extremely time-consuming.

In view of the foregoing, what is needed is a system for editing a color document image in which background and foreground colors of various regions of the document can be individually and easily edited.

SUMMARY OF THE INVENTION

The present invention addresses the foregoing problems by providing a system utilizing a binarized version of a color image and a hierarchical representation of blocks of color image data of the color image to render and to edit various colors of the image. By virtue of the foregoing, background and foreground colors of an input color document can be rendered and edited easily and individually.

Therefore, in one aspect, the present invention is a system to render a color image using a binarized image representing the color image and a hierarchical tree structure representing the color image, the hierarchical tree structure including nodes representing respective blocks of image data within the color image, the nodes containing color information for respective blocks. The system includes defining, in a memory, of a color image rendering area corresponding to a block of image data in the color image, obtaining of foreground color information from a node corresponding to the block of image data, detecting of black pixel locations in the binarized image within an area of the binarized image corresponding to the block of image data, and assigning of the foreground color to pixels at locations in the color image rendering area corresponding to the detected black pixel locations.

As a result of the foregoing aspect, foreground colors of selected color image regions can be efficiently rendered. Moreover, the foregoing aspect of the present invention can be used to easily render foreground colors which have been changed by manipulation of the hierarchical tree.

In an additional aspect, the invention includes obtaining of background color information from the node corresponding to the block of image data, and assigning of the background color to pixels at each location in the color image rendering area which does not correspond to the detected black pixel locations. According to this aspect, background colors of a selected region can be easily rendered and edited.

In yet another aspect, the present invention is a system to edit a color image using a binarized image representing the color image and a hierarchical tree structure representing the color image, the hierarchical tree structure including nodes representing respective blocks of image data within the color image, the nodes containing color information for respective blocks. The system includes selecting of a block of image data in the color image, identifying of a node of the hierarchical tree corresponding to the selected block of image data, editing of a foreground color attribute in the identified node, defining, in a memory, of a color image rendering area corresponding to the block of image data in the color image data, obtaining of the edited foreground color attribute from the node corresponding to the block of image data, detecting of black pixel locations in the binarized image within an area of the binarized image corresponding to the block of image data, and assigning of a foreground color represented by the foreground color attribute to pixels at locations in the color image rendering area corresponding to the detected black pixel locations.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 3 is a view of binarized image data of a color document.

FIG. 7 is a view illustrating several of the FIG. 6 process steps.

FIG. 11 is a view illustrating the FIG. 10 process steps.

FIG. 21 is a view illustrating several of the FIG. 20 process steps.

FIG. 24, which includes FIG. 24A and FIG. 24B, is a flow diagram of computer-executable process steps to edit a solid line according to the present invention.

FIG. 29 is a view illustrating several of the FIG. 28 process steps.

DETAILED DESCRIPTION OF THE PREFERRED EMBODIMENTS

Figure 1:
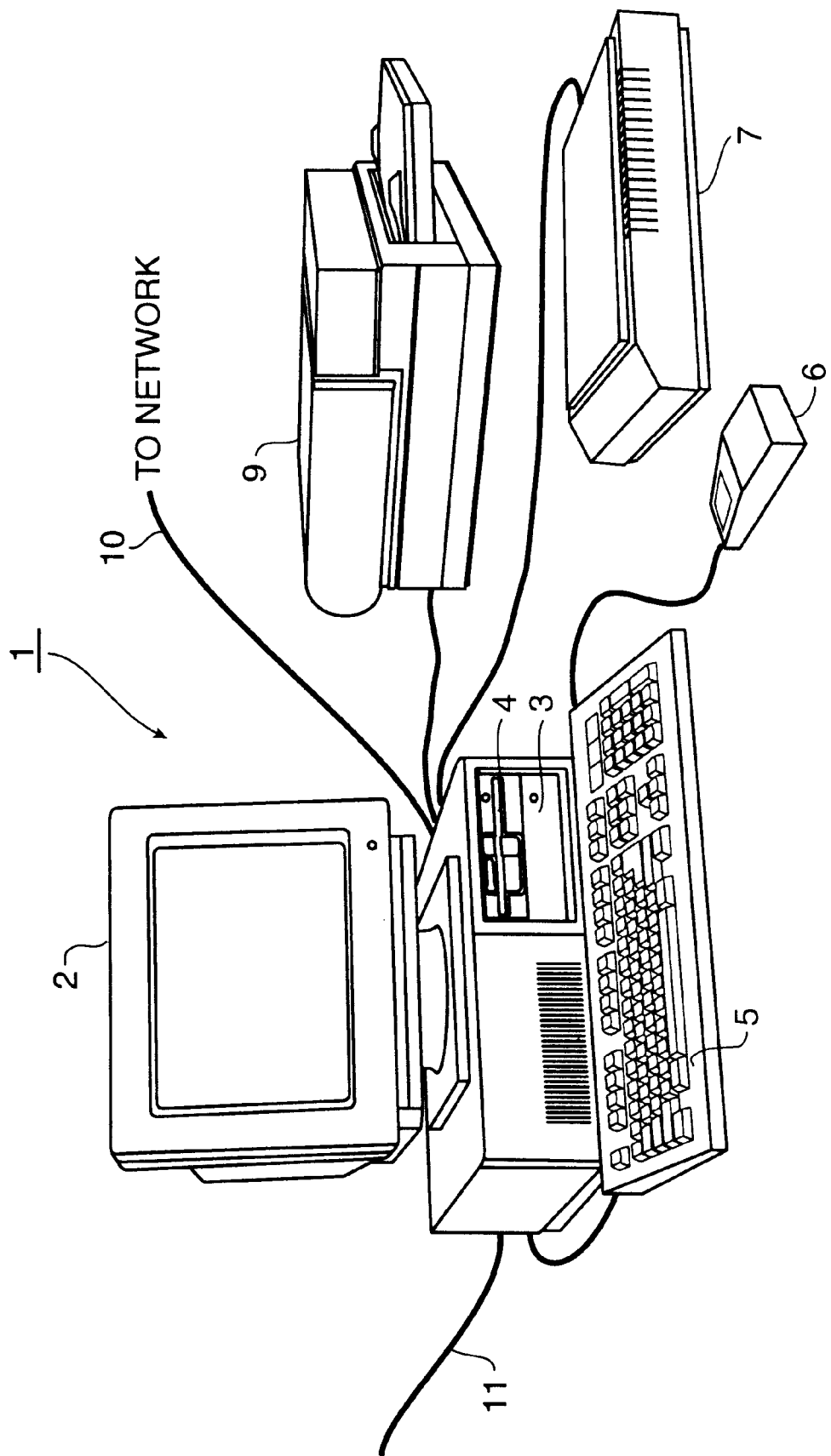
FIG. 1 is an outward view of computing equipment embodying a color editing system according to the present invention.

FIG. 1 is a view showing the outward appearance of representative computing equipment embodying a color editing system according to the present invention.

Shown in FIG. 1 is computing equipment 1, such as an Intel Pentium™-based computer executing a windowing operating system such as the Microsoft Windows98™ operating system. Computing equipment 1 is provided with color display monitor 2, using which computing equipment 1 displays images to a user. Computing equipment 1 is also provided with fixed disk drive 3 for storing data files and application program files, keyboard 5 for inputting text data and for manipulating objects displayed on display 2, and pointing device 6, such as a mouse, which is provided for pointing to and manipulating objects displayed on display 2.

Computing system 1 also includes floppy disk drive 4 for reading from and writing to a floppy diskette. Document image files including color images, as well as computer-executable process steps embodying the present invention, may be stored either on fixed disk 3 or on a floppy disk inserted in floppy disk drive 4. Alternatively, document image files and/or computer-executable process steps may be obtained from a CD-ROM accessed via a CD-ROM drive (not shown).

Also provided with computing equipment 1 are network connection 10 for interfacing with a local area network, and telephone line 11 for interfacing with a telephone network. Document image files and computer-executable process steps embodying the present invention may be accessed over the local area network via network connection 10 or over the telephone network and the World Wide Web ("the Web") via telephone line 11.

Most typically, the applications stored on fixed disk 3, including a color editing system application according to the present invention, are stored to disk 3 after being downloaded from a computer-readable medium, such as a floppy disk, a CD-ROM, a network drive, or the Web.

A color document image may also be input to computing equipment 1 by color scanner 7, which scans a color document in order to provide 24-bit color image data representing the document. The color image data preferably consists of 8-bit red, green, and blue values for each pixel in the document. Of course, other bit-lengths or color spaces can be used to represent a color document image to be edited according to the present invention.

Printer 9 is provided for outputting document images processed by computing equipment 1, and is preferably a color laser-beam printer.

In operation, and under control of the windowing operating system, stored application programs, such as a color editing system application according to the present invention, are selectably activated to process and to manipulate stored data. In accordance with operator instructions, and based on the stored application programs, commands are issued to display image data on display 2, to perform functions on the image data, and to print the displayed images using printer 9.

Figure 2:
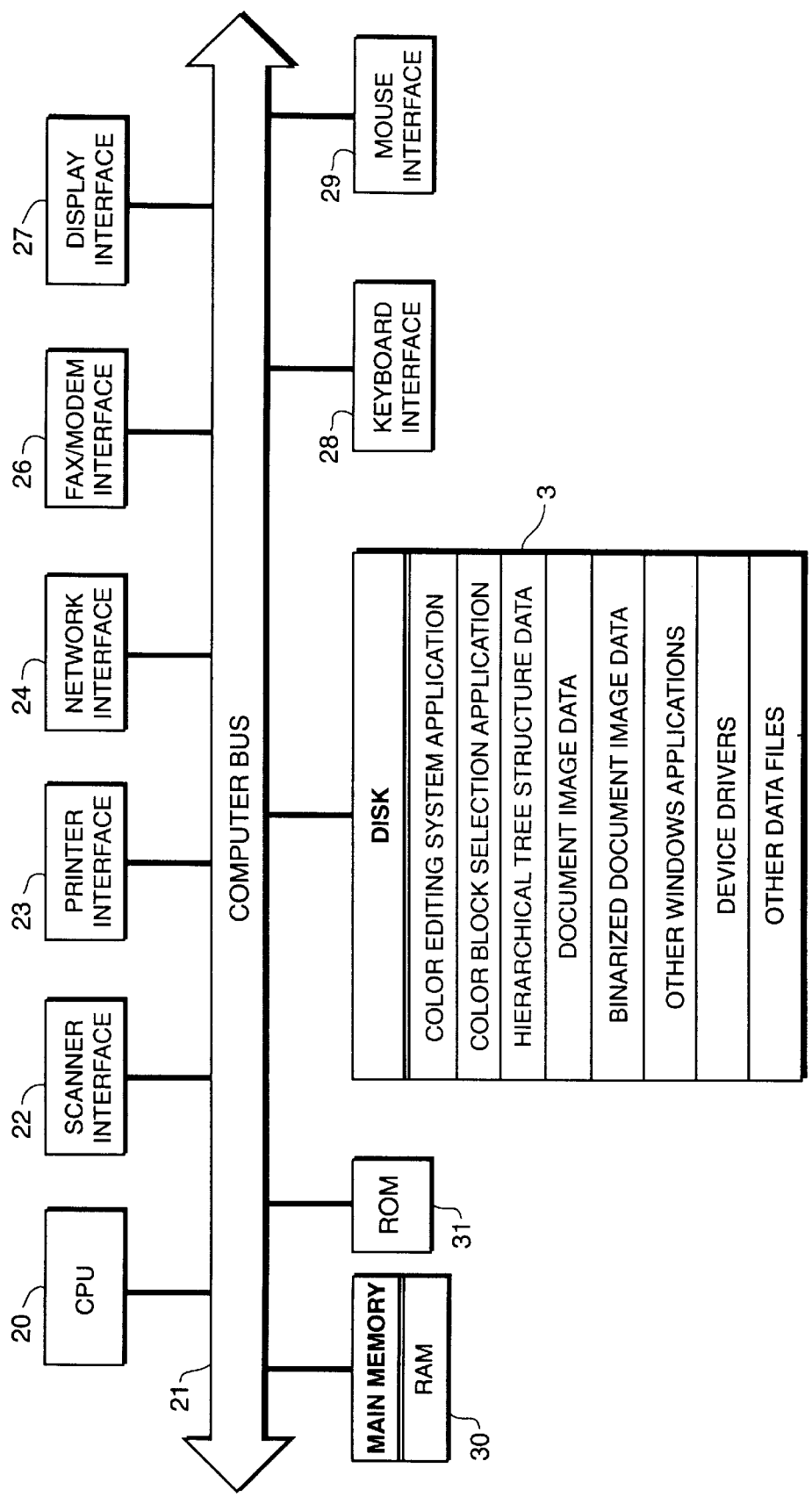
FIG. 2 is a block diagram illustrating the internal architecture of the FIG. 1 computing equipment.

FIG. 2 is a detailed block diagram showing the internal construction of computing equipment 1. As shown in FIG. 2, computing equipment 1 includes a central processing unit (CPU) 20, such as a programmable Pentium T microprocessor, interfaced to computer bus 21. Also interfaced to computer bus 21 are scanner interface 22, printer interface 23, network interface 24, fax/modem interface 26 for connection to telephone line 11, display interface 27, keyboard interface 28, and mouse interface 29.

As shown in FIG. 2, disk 3 stores computer-executable process steps of a color editing system application according to the present invention, computer-executable process steps of a color block selection application, hierarchical tree structure data, document image data, binarized document image data, computer-executable process steps of other windows applications, device drivers, and other data files.

Main memory 30, such as a random access memory (RAM), interfaces to computer bus 21 so as to provide CPU 20 with access to memory storage. In particular, when executing computer-executable process steps such as those stored on disk 3, CPU 20 loads those steps from disk 3 or other storage media into main memory 30 and executes those process steps out of main memory 30. Main memory 30 also provides buffer storage for storing data used during execution of a color editing system according to the present invention.

Read-only memory (ROM) 31 is used for storing computer-executable process steps, such as those used during boot-up, or basic input/output operating system (BIOS) sequences for operation of, for example, keyboard 5.

FIG. 3 is a view of document image data of color document page 40. Due to the difficulty in reproducing color drawing sheets in patent documents, FIG. 3 shows binarized image data representing document page 40. That is, instead of representing each pixel of document page 40 using 24-bit color data as described above, each pixel shown in FIG. 3 is either a black pixel or a white pixel. As shown, document page 40 includes title areas 42, horizontal line 43, text areas 44, 45 and 46, each of which includes lines of text data, halftone picture area 47, frame 48, and table 49.

As will be described in detail below, several aspects of the present invention utilize such a binarized version of a color document page. A binarized version may be obtained by scanning document page 40 while using a "monochrome" feature of scanner 7, but, preferably, the binarized image data shown in FIG. 3 is produced from color image data according to the process described in aforementioned U.S. patent application Ser. No. 09/161,716. Of course, any other binarization method may be used to produce binarized image data for use with the present invention.

Figure 4:
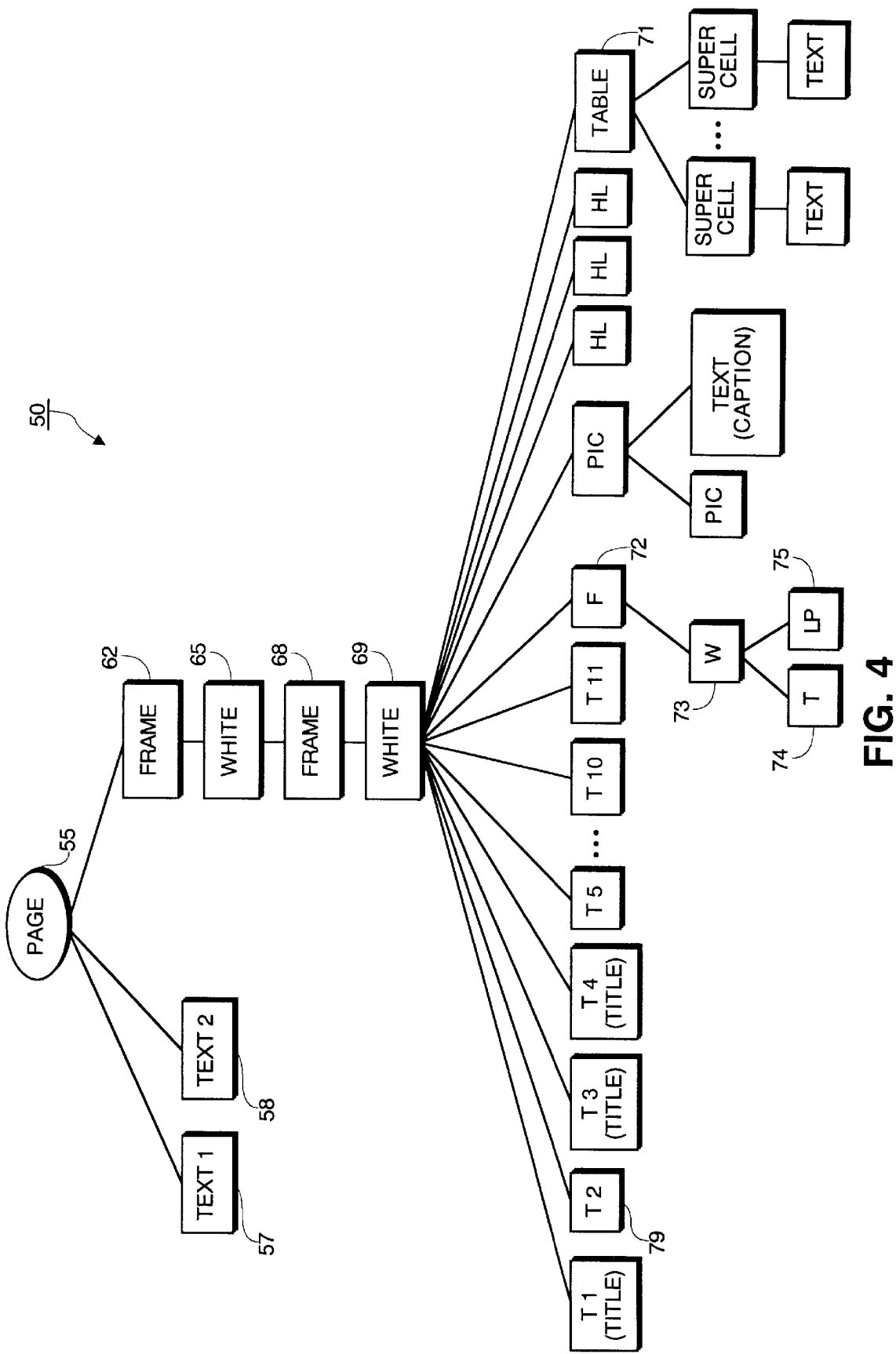
FIG. 4 is a representative view of a hierarchical tree structure of a color document for use in conjunction with the present invention.

As also described below, several aspects of the present invention utilize a hierarchical tree structure of a color document page to be rendered and/or edited. FIG. 4 is a representation of hierarchical tree structure 50, which corresponds to color document page 40 of FIG. 3.

Figure 5:
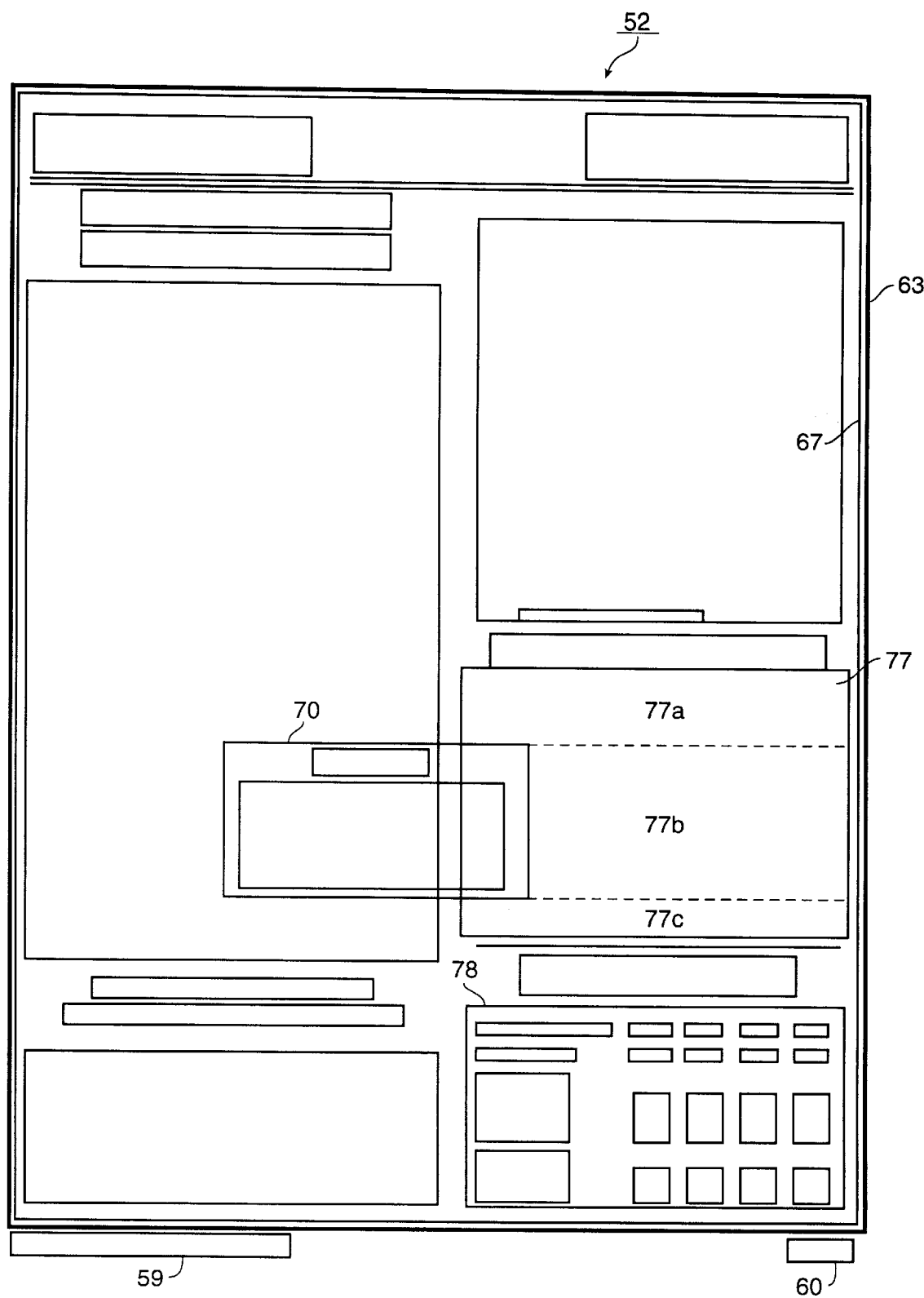
FIG. 5 is a representative view of "blocked" image data of a color document.

Preferably, hierarchical tree structure 50 is produced using techniques described in the aforementioned patent documents. Generally, as described in these documents, a hierarchical tree structure is created by analyzing input image data to identify blocks of image data within the input image data, to identify types of image data located within each identified block, and to identify attributes of the image data. FIG. 5 illustrates typical results of such processing. In this regard, each of the rectangular blocks of blocked representation 52 represents an area of image data of a particular type.

Generally, blocked representation 52 is used to create hierarchical tree structure 50. Specifically, tree structure 50 is arranged according to positional relationships of the blocks of blocked representation 52. In more detail, tree structure 50 begins with page node 55, which represents document page 40. Descending from page node 55 are text 1 node 57 and text 2 node 58, which represent blocks 59 and 60 of blocked representation 52, respectively. Frame node 62 represents large frame block 63, and is a "parent" node to each other node shown in tree structure 50 due to the fact that frame 63 completely surrounds each other block in representation 52. In this regard, white node 65 represents the area within frame block 63, and white node 69 represents the white area within frame block 67. The remaining nodes of tree structure 50 are assigned to blocks of image data following a logic similar to that described above.

Each node of tree structure 50 contains information regarding the block of image data represented by the node. Table 1 lists information preferably contained in each node according to a type of image data represented by the node.

TABLE 1

| BLOCK TYPE | NODE INFORMATION |
| --- | --- |
| Text | Coordinates and Size, Decomposed Rectangle Coordinates, Text Color, Background Color |
| Text Line | Coordinates and Size, Connected Components and Coordinates, Text Line Color, and Background Color |
| Line | Coordinates and Size, Coordinates of Decomposed Rectangles, Line Color and Background Color |
| Frame | Coordinates and Size, Coordinates of Decomposed Rectangles, Frame Color and Background Color |
| Line Art | Coordinates and Size, Coordinates of Decomposed Rectangles, Picture Color and Background Color |
| Picture | |
| Table | Coordinates and Size, Coordinates of Decomposed Rectangles, Table Grid Line Color and Background Color |
| Picture | Coordinates and Size, Coordinates of Decomposed Rectangles, Outline Pairs, Original Bitmap Data and Background Color |
| White | Coordinates and Size, Outline Pairs and Color of White Area |

It should be noted that several of the above-described sets of node information include coordinates of decomposed rectangles. Above-mentioned U.S. Pat. No. 5,774,579 includes detailed descriptions of such decomposed rectangles, however, generally, a block is further defined by several decomposed rectangles in order to allow extraction of data from positions within the block without causing extraction of data not assigned to the block. For instance, as shown in FIG. 5 and by nodes 72 to 75 of tree 50, block 70 of block representation 52 represents frame 48 containing a white area which, in turn, contains a text block and a line-art picture block. However, if the coordinates of block 77 are used to extract text 45, several portions of frame 48 will be extracted therewith. According to U.S. Pat. No. 5,774,579, block 77 is decomposed into blocks 77a, 77b and 77c, denoted by dotted lines in FIG. 5, and coordinates of blocks 77a to 77c are stored in node 79 representing block 77. Coordinates of blocks 77a, 77b, and 77c can then be used to easily extract text 45. As will be seen clearly below, such decomposed rectangle coordinate data is useful in practicing the present invention.

Table node 71 represents table block 78 in blocked representation 52. As shown in FIG. 4, areas within table block 78 are represented by supercell nodes, which are parent nodes to text nodes representing text within the areas defined by parent supercell nodes. Above-mentioned U.S. patent application Ser. No. 09/002,684 describes a system for calculating boundaries of supercell areas in a table. For the present description, supercell areas should be considered equivalent to white areas.

With regard to Table 1, it also should be noted that, in the preferred embodiment, all nodes need not contain background color information. In a case that a node does not contain color information, the node is deemed to have a same background color as that specified in a nearest parent node. For example, in a case that frame node 68 does not include background color information, frame node 68 is assumed to possess a same background color information as that of white node 65. Similarly, in a case that white node 65 and frame node 62 do not contain background color information, frame node 68 is deemed to contain a same background color information as contained in page root node 55.

Returning to the subject of decomposed rectangles, decomposed rectangle information within a node may also be associated with particular foreground or background color information different from that assigned to a node containing the decomposed rectangle. Moreover, in a case that a picture node contains decomposed rectangles, original bitmap data within each decomposed rectangle are separately associated with corresponding decomposed rectangles.

Figure 6:
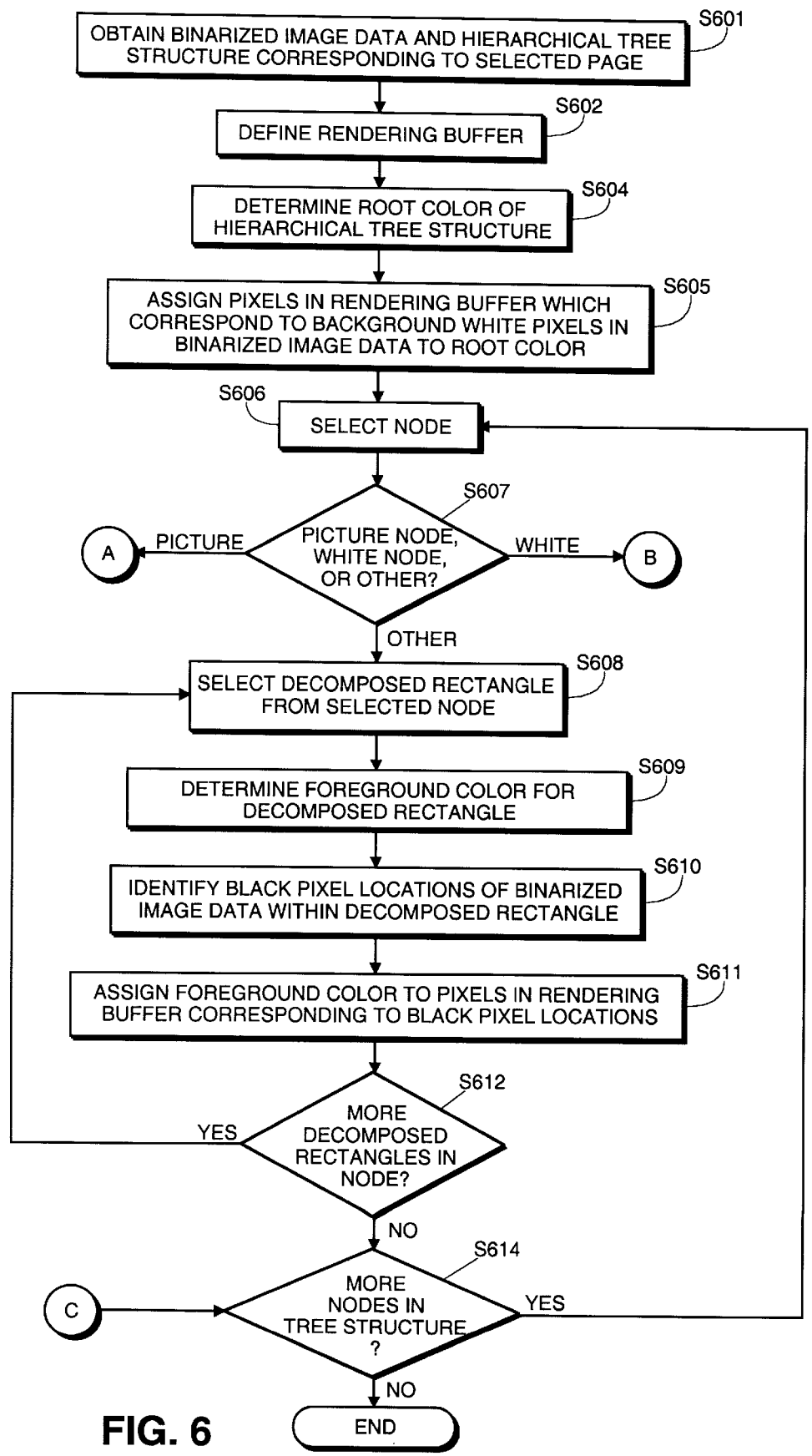
FIG. 6 is a flow diagram of computer-executable process steps to render color image data according to the present invention.

FIG. 6 is a flow diagram of computer-executable process steps to render a color image according to the present invention. Preferably, the FIG. 6 process steps are loaded from fixed disk 3 to main memory 30 and executed therefrom by CPU 20.

The FIG. 6 process steps are executed to render a color image using a binarized image representing the color image and a hierarchical tree structure representing the color image, the hierarchical tree structure including nodes representing respective blocks of image data within the color image, the nodes containing color information for respective blocks. The steps include a defining step to define, in a memory, a color image rendering area corresponding to a block of image data in the color image, an obtaining step to obtain foreground color information from a node corresponding to the block of image data, a detecting step to detect black pixel locations in the binarized image within an area of the binarized image corresponding to the block of image data, and an assigning step to assign the foreground color to pixels at locations in the color image rendering area corresponding to the detected black pixel locations.

More specifically, the FIG. 6 flow begins at step S601, in which binarized image data of a hierarchical tree structure corresponding to a selected page is obtained. For example, the binarized image data shown in FIG. 3 as well as hierarchical tree structure 50 are obtained in step S601 in response to a selection of page 40. Next, in step S602, a rendering buffer is defined in a memory such as main memory 30. The rendering buffer is defined so as to have a one-to-one pixel relationship with the binarized image data.

In step S604, the obtained hierarchical tree structure is examined to determine a root color of the selected page. This color is most often found within a page root node of the tree structure. Next, in step S605, the root color is assigned to each pixel within the rendering buffer having a position which corresponds to a position of a white pixel in the binarized image data but which is not located within outline pairs of any child frame, table, or picture. Outline pairs are described in detail below.

A particular node of the obtained tree structure is then selected in step S606. If, in step S607, the node is determined to be a node of a type other than a picture node or a white node, flow proceeds to step S608, in which a decomposed rectangle is selected from within the selected node. The foreground color for the decomposed rectangle is determined in step S609. As described above, the decomposed rectangle may be assigned its own particular foreground color, however, if not, the decomposed rectangle shares the foreground color of its nearest parent node having an assigned foreground color.

Thereafter, in step S610, coordinates of the selected decomposed rectangle are used to identify locations of black pixels which are within the binarized image data and also within the area of the decomposed rectangle. For each such location, in step S611, pixels in the rendering buffer having corresponding locations are assigned the foreground color. In step S612, it is determined whether additional decomposed rectangles exist in the selected node. In a case that more decomposed rectangles exist in the node, flow returns to step S608. If no more decomposed rectangles exist in the node, flow continues to step S614, wherein, if more nodes are present in the tree structure, flow returns to step S606. It should be noted that, in a case that the selected node does not contain any decomposed rectangles, steps S608 to S611 are performed with respect to the coordinates and foreground color of the selected node.

Figure 7:
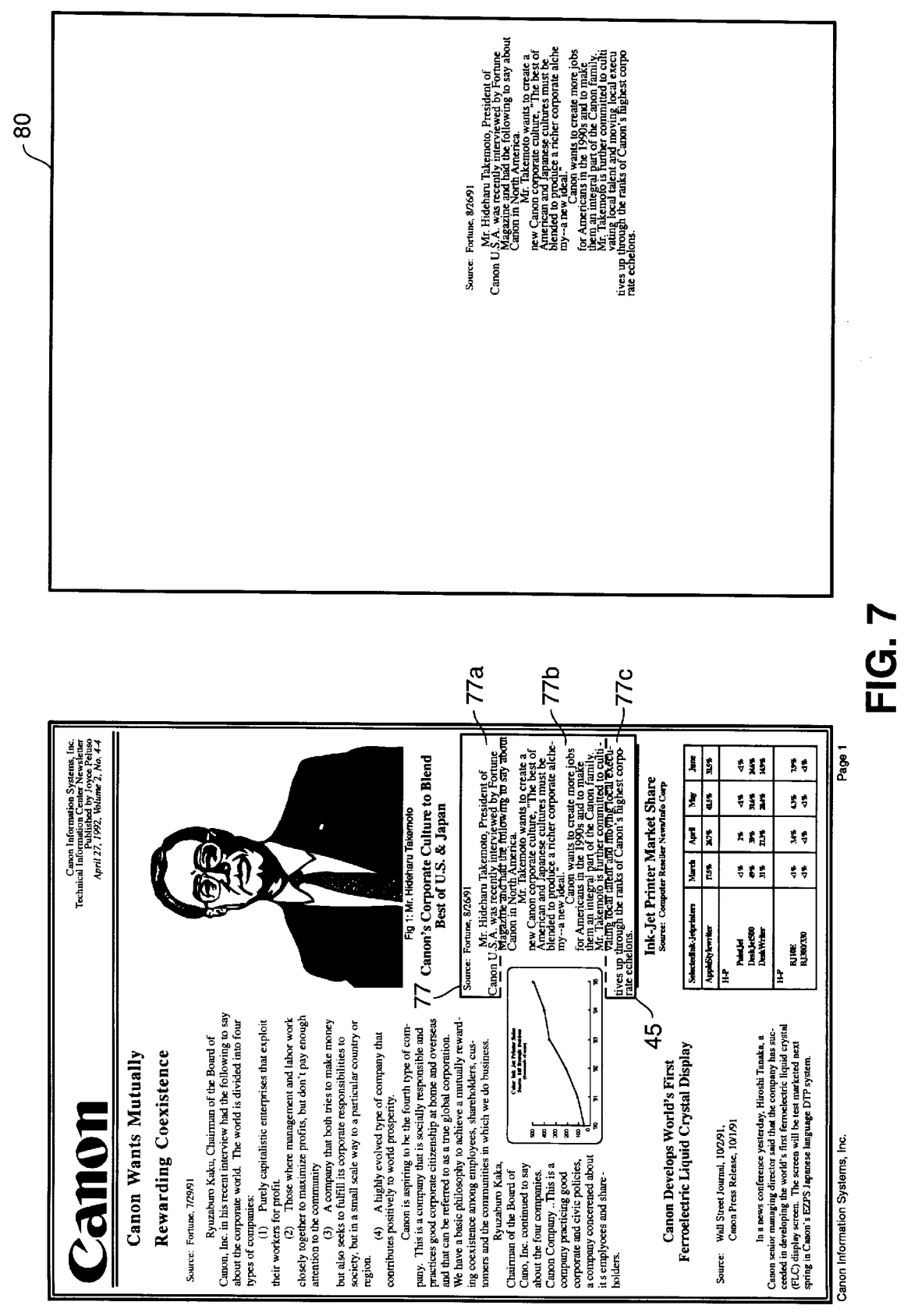

FIG. 7 illustrates an example of steps S608 to S611 of FIG. 6. As shown in FIG. 7, node 79 of FIG. 4, which corresponds to text 45, is selected and decomposed rectangles 77a, 77b, and 77c are individually analyzed with respect to binary image data 40. Based on the FIG. 6 flow, for each black pixel location within decomposed rectangle 77a, decomposed rectangle 77b and decomposed rectangle 77c, a corresponding location in rendering buffer 80 is assigned a foreground color. It should also be noted that, based on steps S604 and S605, each pixel in rendering area 80 which was not assigned a foreground color in step S611 is assigned the determined root color.

Figure 8:
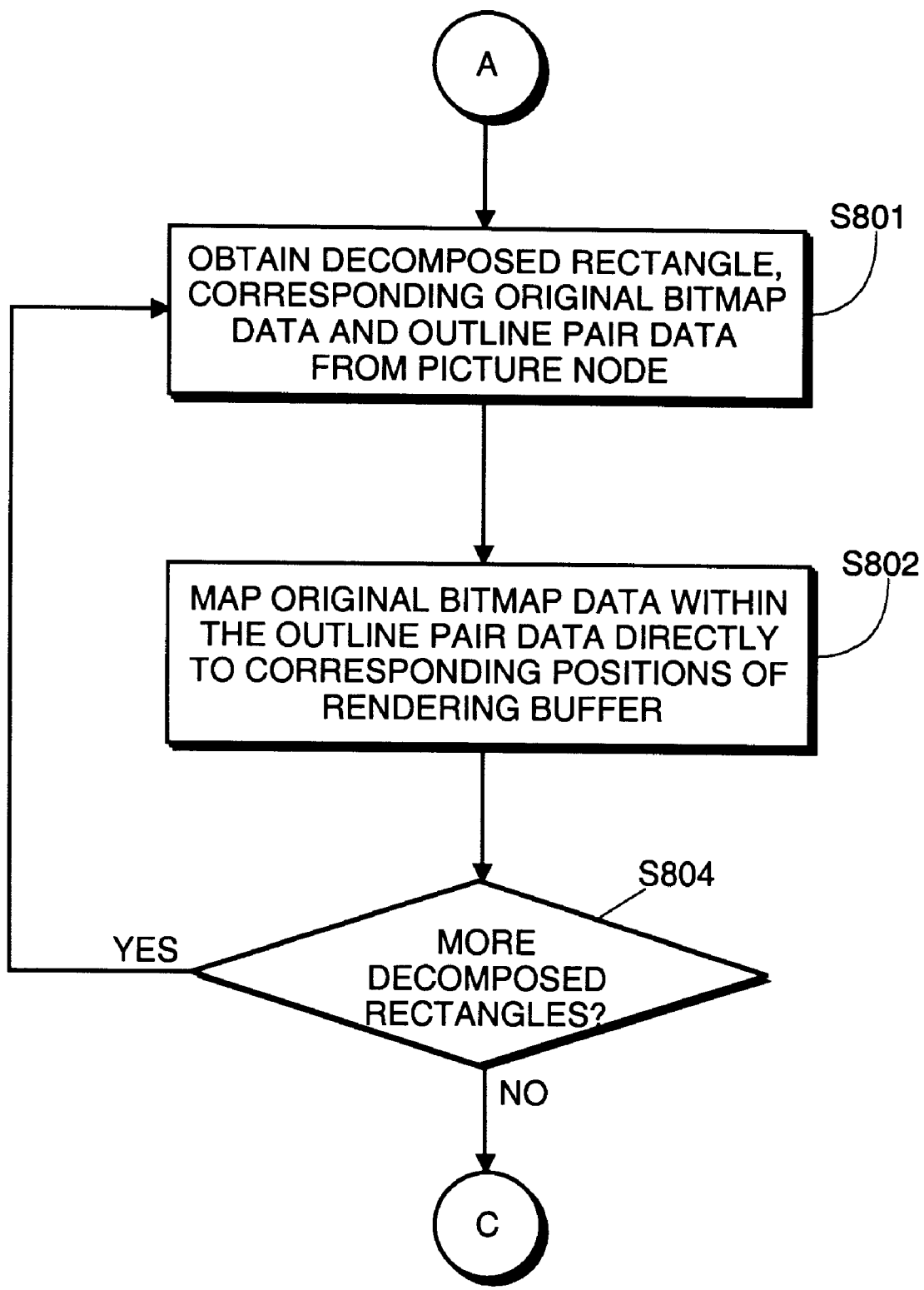
FIG. 8 is a flow diagram of computer-executable process steps to render color image data according to the present invention.

If, in step S607, it is determined that a picture node has been selected in step S606, flow proceeds to step S801 of FIG. 8. In step S801, a decomposed rectangle is obtained from the selected picture node, along with original bitmap data of the picture and outline pair data for the original bitmap data, which is also stored within the picture node. As described in detail in Ser. No. 08/664,674, outline pair data consists of pairs of pixel coordinates used to locate data on a scan line. For example, in the present case, outline pair data consisting of coordinates (5, 20) and (5, 60) indicates that picture data exists between the twentieth and sixtieth pixels of scan line five.

Figure 9:
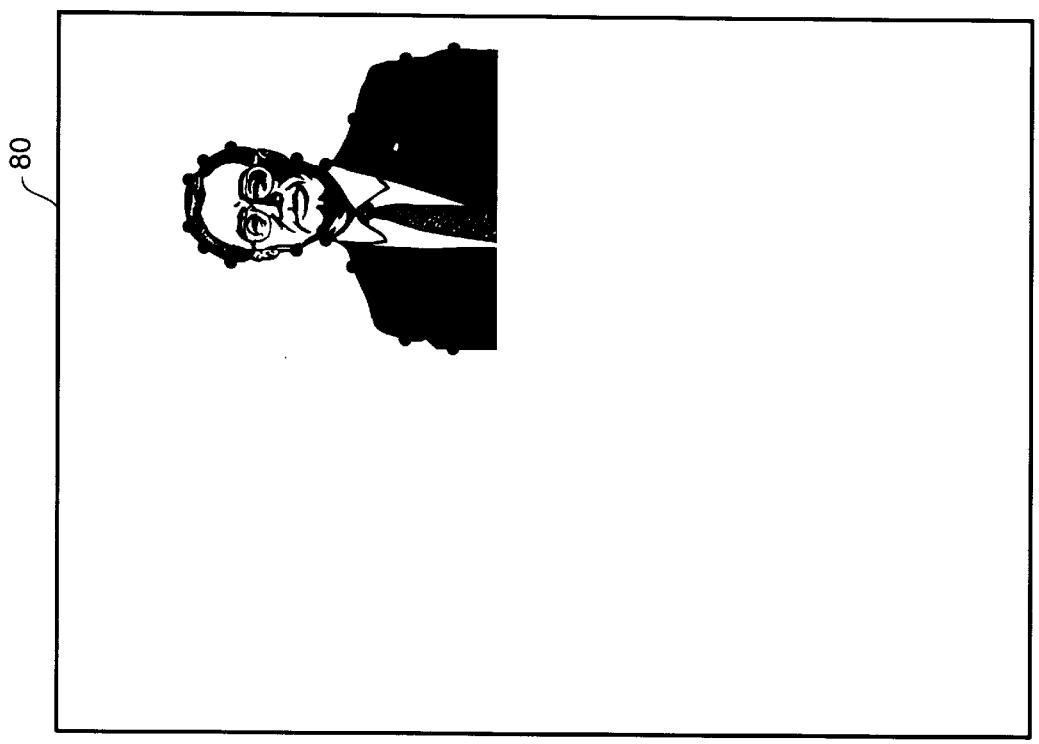
FIG. 9 is a view illustrating the FIG. 8 process steps.

Accordingly, in step S802, the obtained original bitmap data is mapped directly to positions of the rendering buffer corresponding to the outline pair data. For example, as shown in FIG. 9, a first scan line of the obtained original bitmap data is positioned between pixel coordinates indicated by the first obtained outline pair, indicated by pronounced dots in FIG. 9. This process repeats for each scan line of the obtained image data using outline pair information corresponding to each scan line. Flow then proceeds to step S614. Accordingly, using outline pair data as described above, the original bitmap image data can be rendered at an appropriate location in rendering buffer 80.

Figure 10:
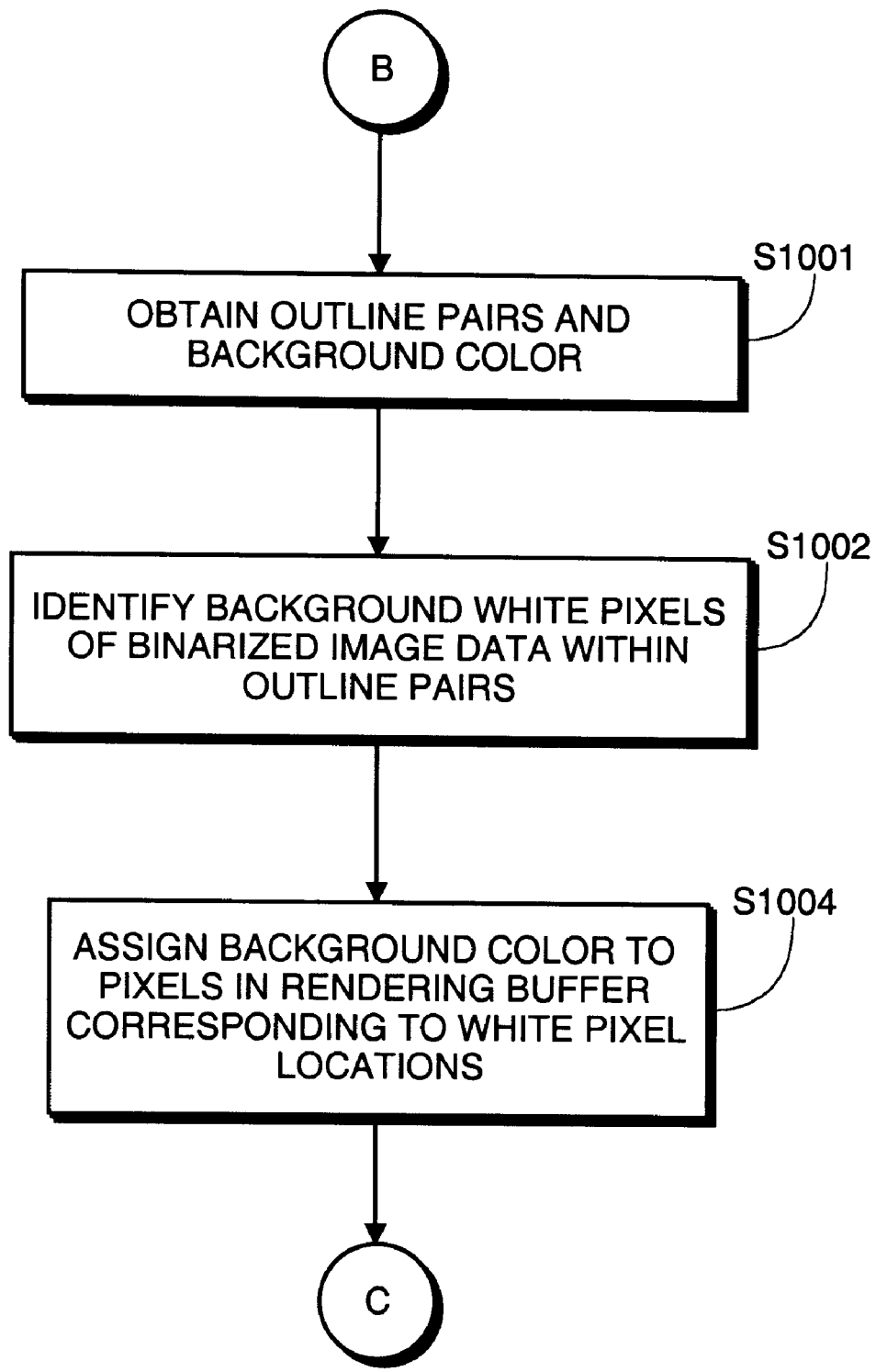
FIG. 10 is a flow diagram of computer-executable process steps to render color image data according to the present invention.

If, in step S607, it is determined that the selected node is a white node, flow proceeds to steps S1001 of FIG. 10. At step S1001, outline pairs and background color information are obtained from the selected white node. Previously-discussed techniques are used to determine the background color in a case that the white node does not contain background color information. Flow continues to step S1002, in which the binarized image data is examined to identify locations of white pixels outside any other picture, frame, or table outline pairs but within the obtained outline pairs. Next, in steps S1004, pixels in the rendering buffer which correspond to the identified white pixel locations are assigned the background color obtained in step S1001. Flow then proceeds to step S614 as described above.

As an example of the FIG. 10 process steps, FIG. 11 shows binarized image data of page 40 in which pronounced dots indicate outline pairs of a white area within frame 48. As described with respect to FIG. 10, pixels of rendering buffer 80 having locations corresponding to only the white pixel locations between outline pairs of a scan line of the binarized image data are assigned the obtained background color of the white area, represented by node 73 of hierarchical tree structure 50.

By virtue of the process steps of FIG. 6, FIG. 8 and FIG. 10, a substantial reproduction of color document 40 can be rendered from a relatively small amount of data.

Figure 12:
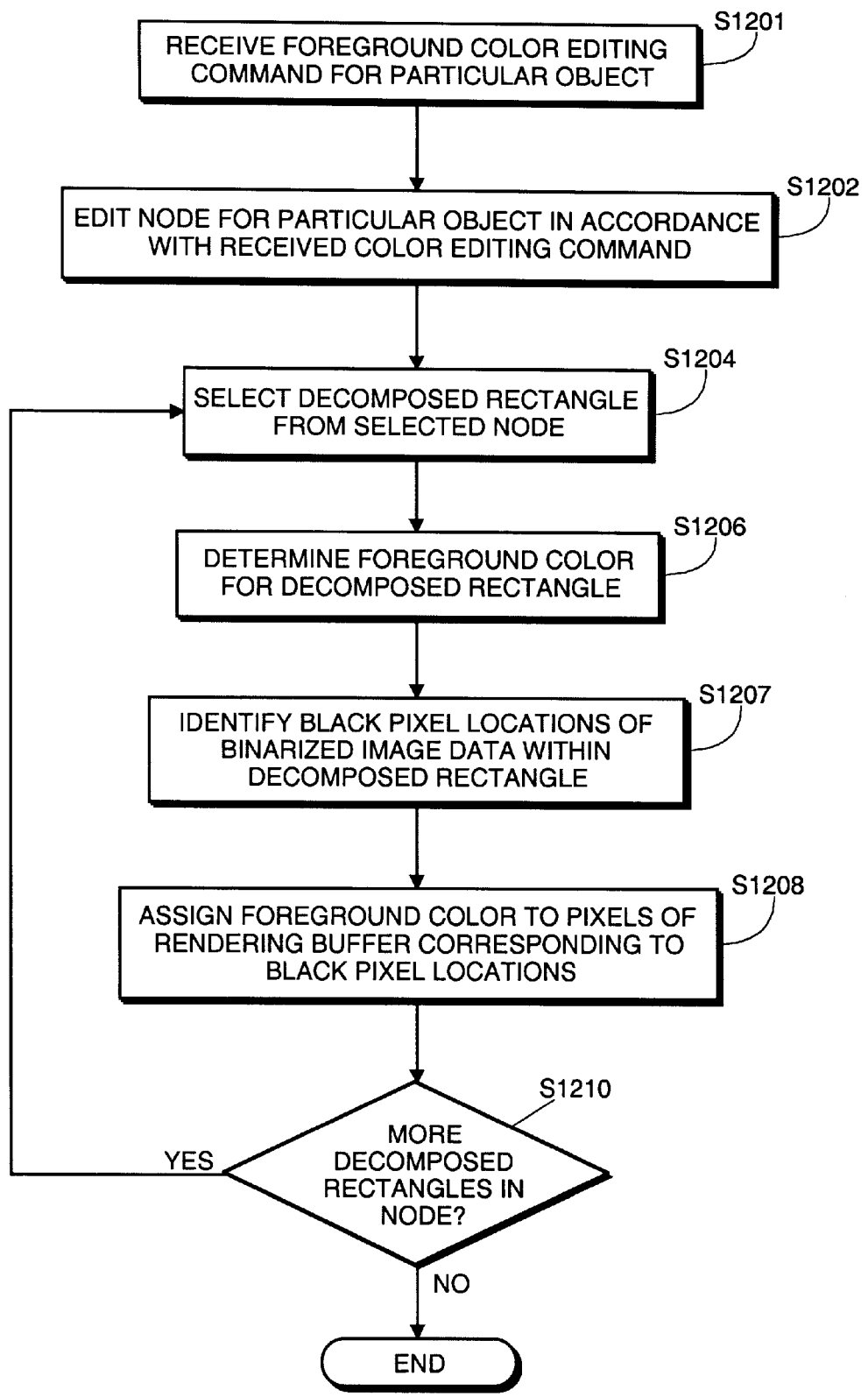
FIG. 12 is a flow diagram of computer-executable process steps to edit color image data according to the present invention.

In another aspect, the present invention provides efficient editing of colors within a color document. For example, FIG. 12 is a flow diagram of computer-executable process steps to edit color data of an object according to the present invention. The process steps of FIG. 12 are preferably stored on fixed disk 3, loaded to main memory 30 and executed therefrom by CPU 20.

Briefly, the FIG. 12 process steps include steps to edit a color image using a binarized image representing the color image and a hierarchical tree structure representing the color image, the hierarchical tree structure including nodes representing respective blocks of image data within the color image, the nodes containing color information for respective blocks. The steps include a selecting step to select a block of image data in the color image, an identifying step to identify a node of the hierarchical tree corresponding to the selected block of image data, an editing step to edit a foreground color attribute in the identified node, a defining step to define, in memory, a color image rendering area corresponding to the block of image data in the color image, an obtaining step to obtain the edited foreground color attribute from the node corresponding to the block of image data, an detecting step to detect black pixel locations in the binarized image within an area of the binarized image corresponding to the block of image data, and an assigning step to assign a foreground color represented by the foreground color attribute to pixels at locations in the color image rendering area corresponding to the detected black pixel locations.

More specifically, in step S1201, a command to edit the foreground color of a particular object is received. Such a command may be entered through user manipulation of a graphical user interface displayed on monitor 2 using keyboard 5 or mouse 6, or by any method for selecting an object and a process to be applied to that object known to those of ordinary skill in the art. The particular objects contemplated for editing using the FIG. 12 process steps include a text block, a text line, a line art picture, a frame, a line or a table. Next, in step S1202, a node of a hierarchical structure corresponding to the particular object is edited in accordance with the received editing command. More particularly, the foreground color information located in a node representing the particular object is edited to reflect a selected foreground color indicated by the received color editing command.

It should be noted that each decomposed rectangle in a node can include foreground color, background color, foreground pattern, and background pattern information. Accordingly, in step S1202, the information of all decomposed rectangles within the corresponding node must be edited to reflect the selected foreground color.

Figure 12A:
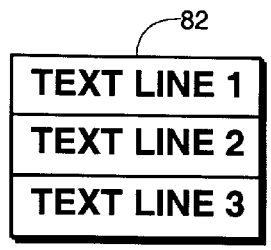
FIG. 12A to FIG. 12D illustrate editing of a text line object according to the present invention.
Figure 12B:
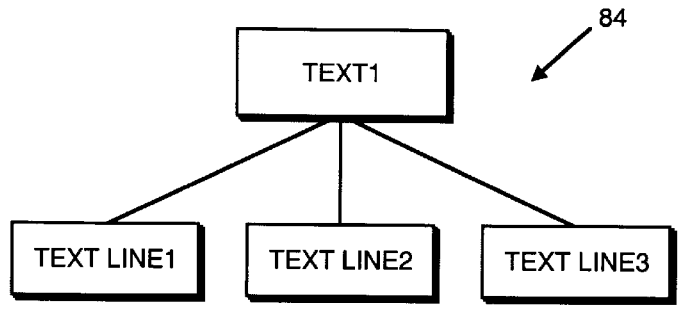
Figure 12C:
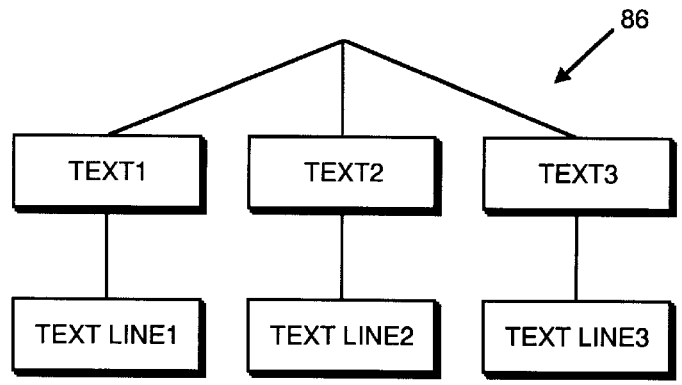

FIG. 12A to FIG. 12D illustrate a preferred method of performing editing in step S1202 in the case of editing a foreground color of a text line object. In this regard, FIG. 12A shows text block 82 including text line1, text line2, and text line3. FIG. 12B illustrates a portion of a hierarchical tree structure having nodes representing text block 82. In accordance with the hierarchical tree format described above, structure 84 includes a parent node representing text block 82 and three child nodes representing each of text line1, text line2, and text line3.

For the present example, it is assumed that the foreground information of each node of structure 84 indicates a red foreground color. In a case that, in step S1201, the received color editing command requires a change in the foreground color of text line2 to change from red to yellow, structure 84 is converted in step S1202 to the structure of FIG. 12C. As shown, structure 86 includes nodes for three text blocks, each a parent to a node representing one of text line1, text line2, or text line3. By virtue of structure 86, block 82 is treated as three separate text blocks. Preferably, in a case that the foreground color information of the three text line objects is edited in step S1201 to again coincide with one another, structure 86 reverts back to structure 84 in step S1202.

Figure 12D:
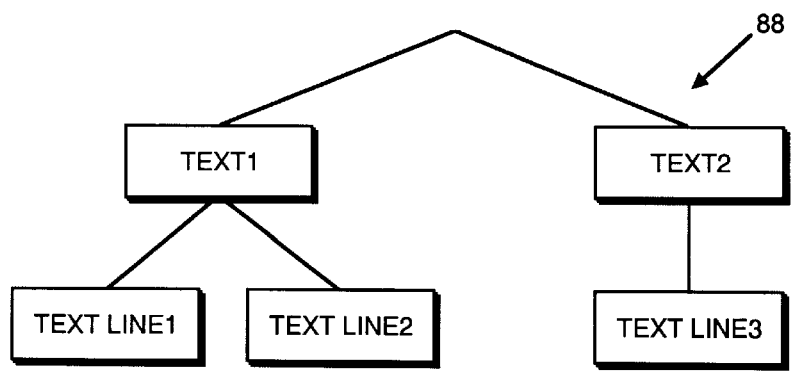

FIG. 12D shows structure 88, which is formed from structure 84 in step S1202 if, in step S1201, a command to change the foreground color of text line3 of block 82 to yellow is received. As described above with respect to FIG. 12C, structure 88 reverts back to structure 84 if the foreground colors of text line1, text line2, and text line3 are thereafter edited so as to coincide with one another. Moreover, it should be noted that any internal decomposed rectangles of the nodes of structure 84 might require recalculation or reassignment to other nodes due to the above-Described transformation of structure 84 to structure 86 or structure 88.

Returning to the general case, the particular object edited in step S1201 is re-rendered according to step S1204 to step S1210. In this regard, a decomposed rectangle is selected from the edited node in step S1204. Next, in step S1206, the foreground color of the decomposed rectangle is determined. As described above, the foreground color information may be specific to the decomposed rectangle and contained in the edited node, or may be found in a parent node. The foreground color may also have been edited in step S1202. In step S1207, black pixel locations of the binarized image data which are within the decomposed rectangle are identified and, in step S1208, the determined foreground color is assigned to pixels of the rendering buffer corresponding to the identified black pixel locations. In step S1210, it is determined whether more decomposed rectangles exist in the node. If so, flow returns to step S1204. If not, flow terminates. It should be noted that step S1204 to step S1210 are performed with respect to only the edited node in a case that the edited node does not contain any decomposed rectangle. It also should be noted that the rendering of FIG. 12 proceeds similarly to that of step S608 to step S612 of FIG. 6.

Figure 13:
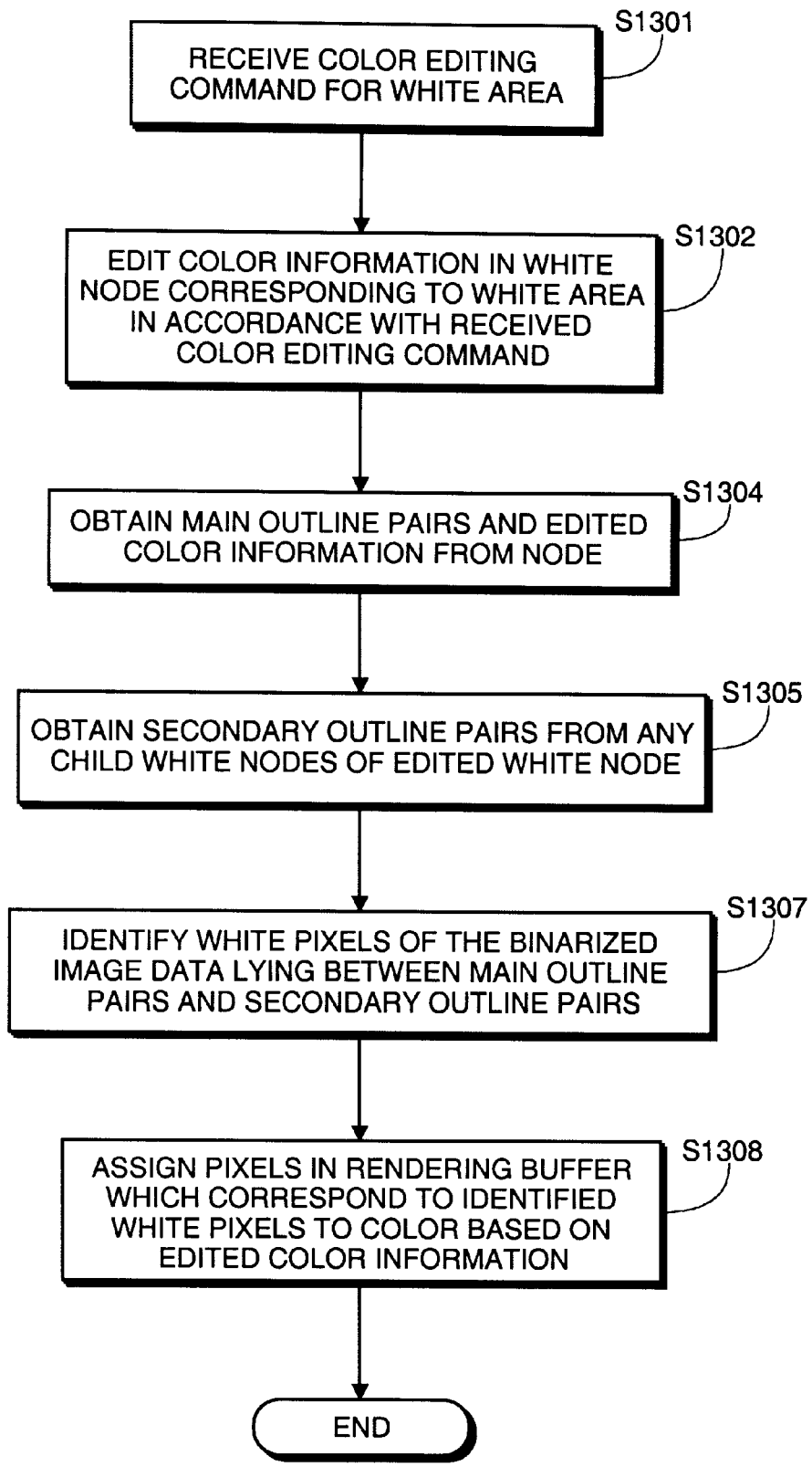
FIG. 13 is a flow diagram of computer-executable process steps to edit color image data according to the present invention.

FIG. 13 is a flow diagram of computer-executable process steps to edit a color of a white area according to the present invention. Initially, in step S1301, a color editing command for a white area is received. Next, in step S1302, color information in a white node corresponding to the white area is edited in accordance with the received color editing command. Specifically, the background color of the white area is changed in step S1302 in accordance with the editing command. In step S1304, outline pairs and the edited color information are obtained from the white node. For the purposes of the description FIG. 13, such outline pairs will be referred to as main outline pairs. Next, in steps S1305, outline pairs are obtained from any existing child white nodes of the edited white node. These outline pairs are herein referred to as secondary outline pairs. Next, in step S1307, white pixels of the binarized image data which lie between main outline pairs and outside of secondary outline pairs are identified. Then, in step S1308, pixels in the rendering buffer which correspond to the identified white pixels are assigned a color based on the edited color information.

Figure 14:
FIG. 14 is a view illustrating several of the FIG. 13 process steps.

FIG. 14 shows binarized image data of page 40 along with several outline pairs belonging to white nodes 65 and 69 of tree structure 50. As can be seen from FIG. 14, in order to properly edit a color of the white area represented by node 65, pixels within outline pairs of node 65 but outside of outline pairs of node 69 must be identified and edited.

Figure 15:
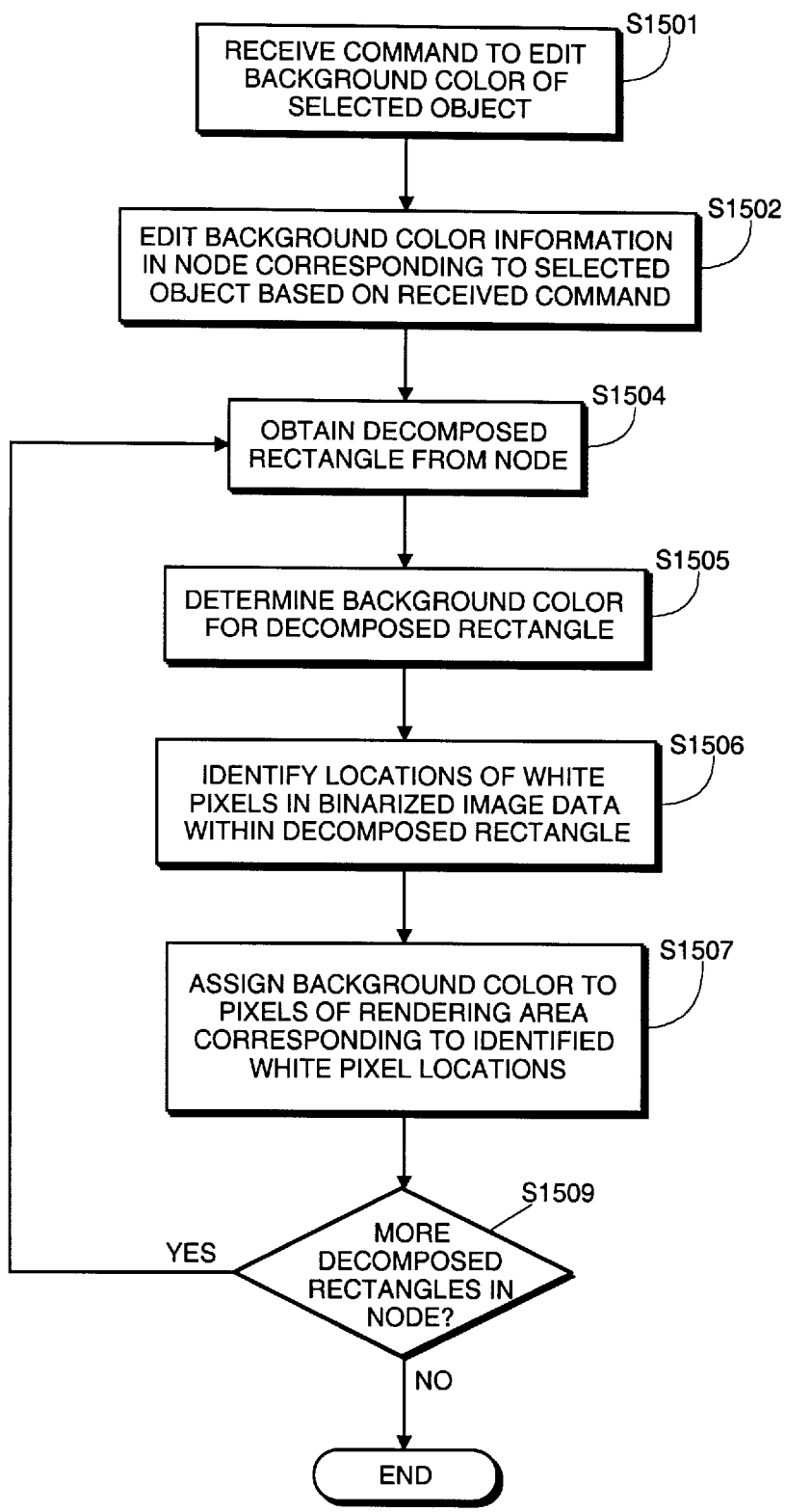
FIG. 15 is a flow diagram of computer-executable process steps to edit background color data according to the present invention.

FIG. 15 is a flow diagram of process steps to edit a background color of a selected object. As described above with respect to FIG. 12, the objects contemplated by the FIG. 15 steps include a text block, a text line, a line art picture, a frame, a line and a table. In this regard, a command to edit a background color of a selected object is received in step S1501. In step S1502, background color information in a node corresponding to the selected object is edited based on the received command. As mentioned with respect to step S1202, background color information of any decomposed rectangles in the corresponding node should be edited in step S1502 based on the received command. As also described above with respect to FIG. 12, editing of the node may cause corresponding structure of a hierarchical tree to change in a case that the selected object is a text line. Next, in step S1504, a decomposed rectangle is obtained from the node, and, in step S1505, the background color for the decomposed rectangle is determined.

In step S1506, locations of white pixels of the binarized image data within the decomposed rectangle are identified. Pixels of the rendering area corresponding to the identified white pixels are then assigned the determined background color in step S1507. Thereafter, in step S1509, flow returns to step S1504 in a case that more decomposed rectangles exist in the node. If not, flow terminates. It should be noted that steps S1504 to S1509 proceed similarly to step S608 to step S612, with the exception that steps S1504 to S1509 concern white pixels of a decomposed rectangle and the background color of a selected object, rather than black pixels of a decomposed rectangle and a foreground color of the selected object.

Figure 16:
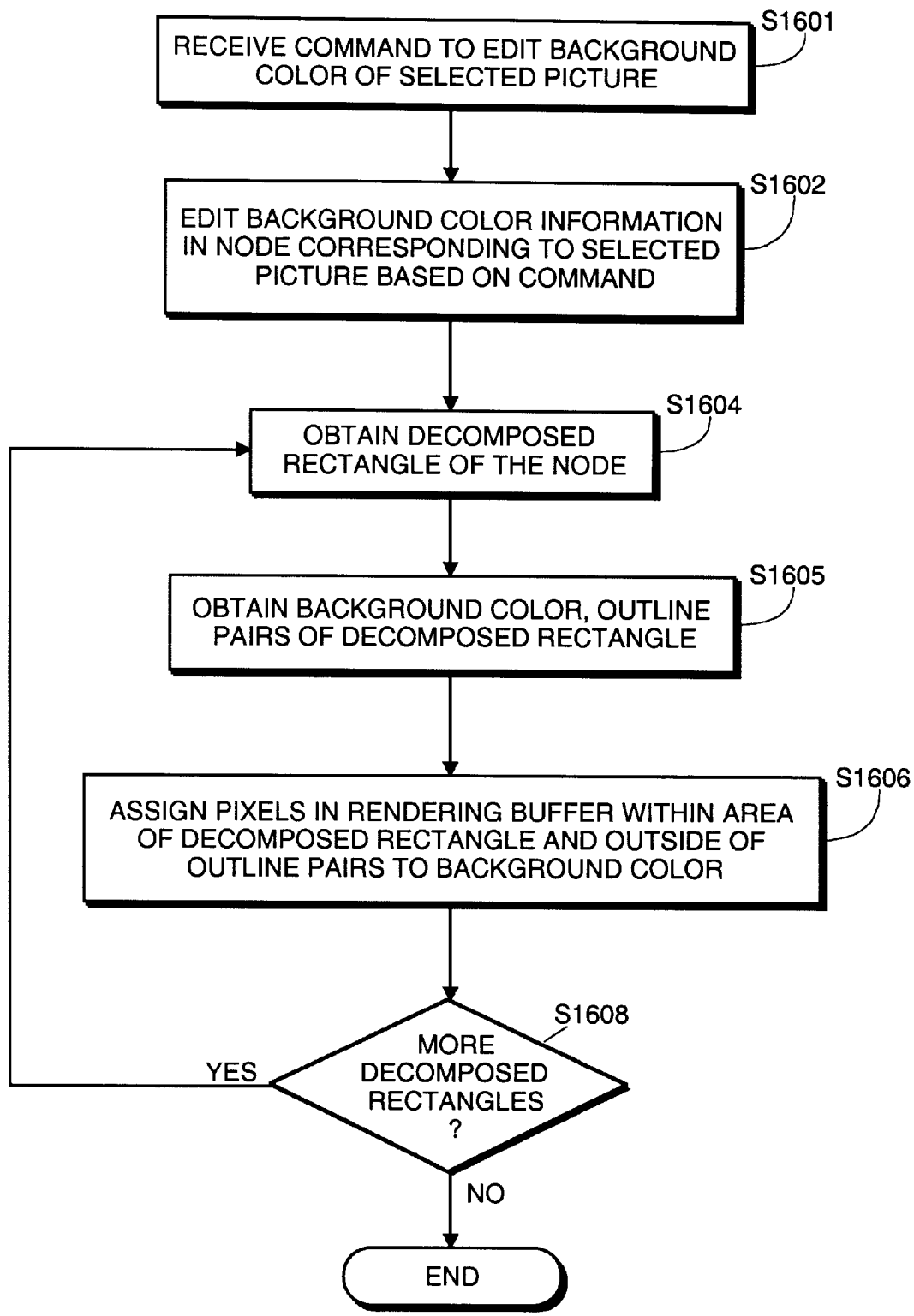
FIG. 16 is a flow diagram of computer-executable process steps to edit background color data according to the present invention.

FIG. 16 is a diagram of computer-executable process steps to edit a background color of a selected picture in a document image. In this regard, flow begins at step S1601, in which a command to edit a background color of a selected picture is received. In step S1602, background color information of a node corresponding to the selected picture is edited based on the received command, such editing including editing of background color information of any decomposed rectangles in the node. Next, in step S1604, a decomposed rectangle of the node is obtained. The background color of the decomposed rectangle, as well as outline pairs corresponding to the decomposed rectangle, are obtained in step S1605. In step S1606, pixels in the rendering buffer within an area of the decomposed rectangle and outside of the obtained outline pair are assigned to the background color. It is then determined, in step S1608, whether additional decomposed rectangles exist in the node. If so, flow returns to step S1604. If not, flow terminates.

Figure 17:
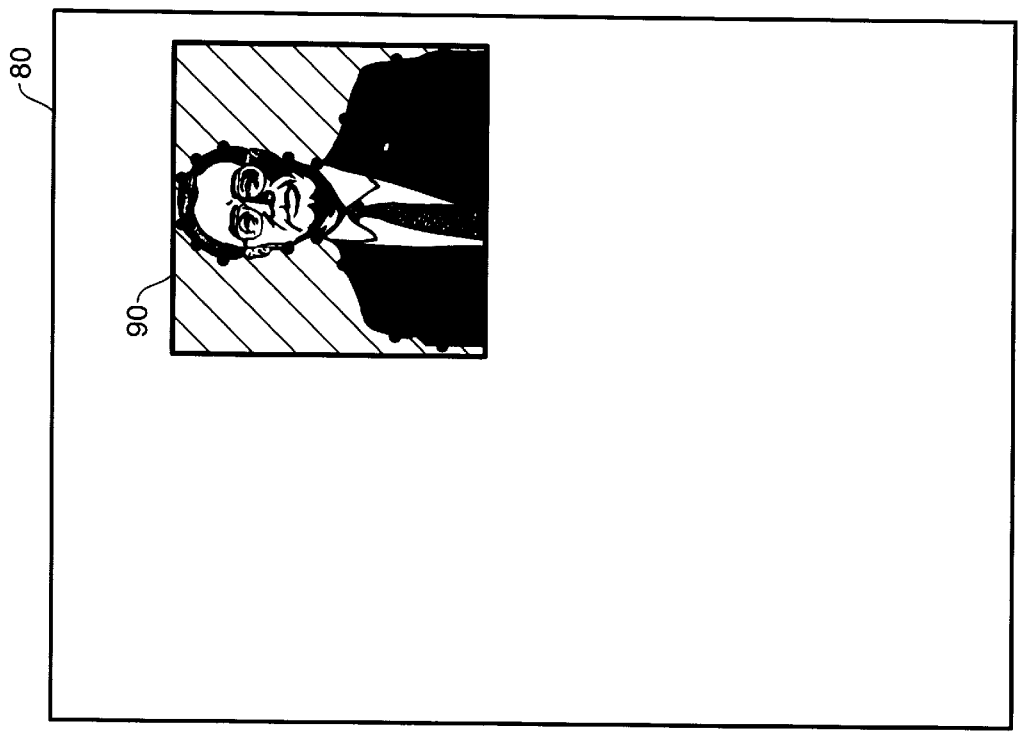
FIG. 17 is a view illustrating several of the FIG. 16 process steps.

FIG. 17 illustrates rendering buffer 80 after editing the background color of picture 47. The new background color is represented by the hatched lines, and the decomposed rectangle of the node obtained in step S1604 is illustrated by rectangle 90. The obtained outline pairs are indicated by points within rectangle 90. According to step S1606 of FIG. 16, it is clear from FIG. 17 that pixels in rendering buffer 80 within the area of rectangle 90 and outside of the outline pairs are each assigned an edited background color in order to edit the background color of picture 47.

Figure 18:
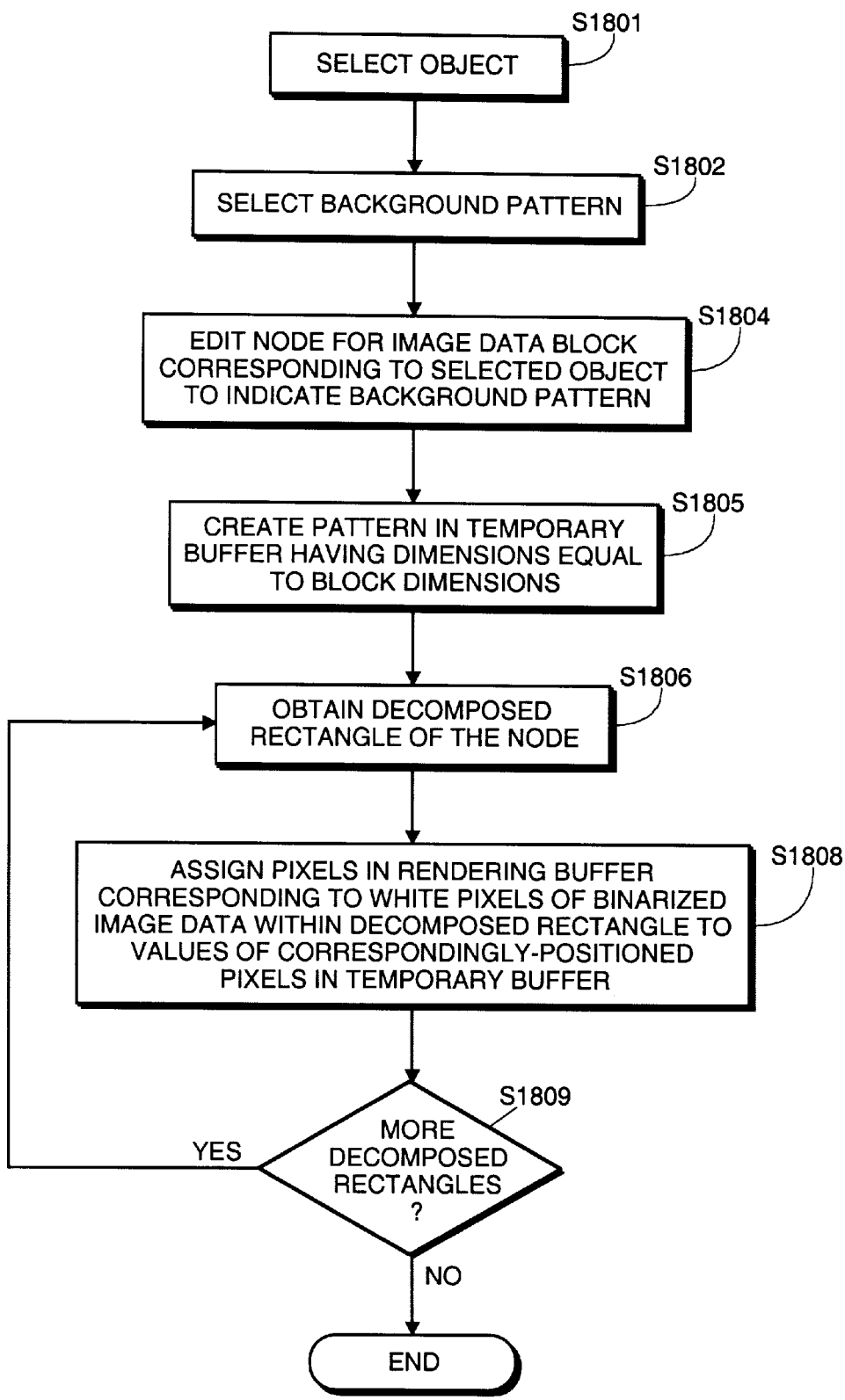
FIG. 18 is a flow diagram of computer-executable process steps to edit a background pattern according to the present invention.

FIG. 18 is a diagram of the process steps to change a background pattern of a selected object. In this regard, an object of a type described above with respect to FIG. 12 and FIG. 15 is selected in step S1801. Next, in step S1802, a background pattern for the selected object is selected. In step S1804, a node corresponding to the selected object is edited so as to indicate the selected background pattern. Editing of the node preferably includes editing of any decomposed rectangle in the node to also indicate the selected background pattern.

In step S1805, the selected pattern is created in a temporary buffer which possesses dimensions equal to dimensions of the corresponding image data block represented by the node. In step S1806, a decomposed rectangle of the node is obtained. Next, in step S1808, pixels of the rendering buffer corresponding to white pixels of the binarized image data which are within the decomposed rectangle are assigned values of correspondingly-positioned pixels of the pattern in the temporary buffer. Step S1808 will be described further below. Flow then proceeds from step S1809 back to step S1806 if more decomposed rectangles exist in the node. If not, flow terminates at step S1809.

Figure 19:
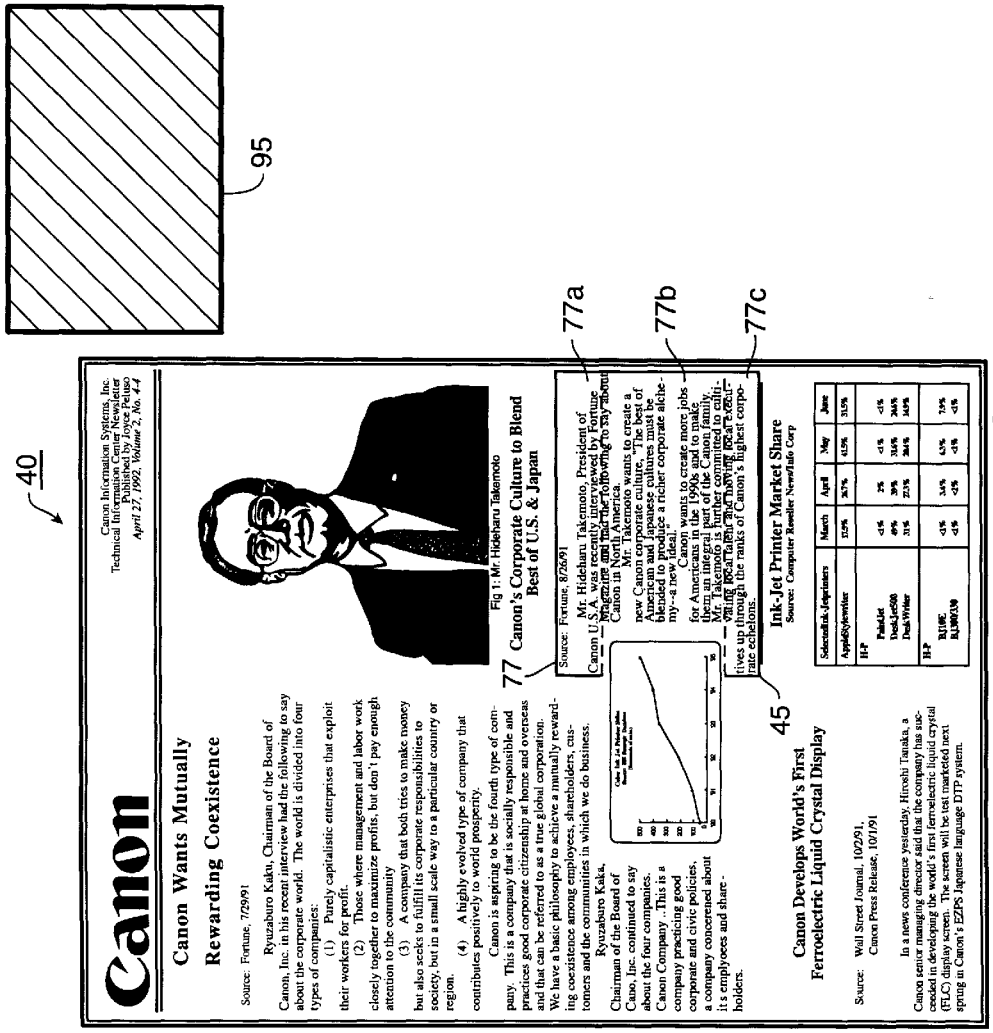
FIG. 19 is a view illustrating several of the FIG. 18 process steps.

FIG. 19 illustrates several steps of FIG. 18. In particular, FIG. 19 shows binarized image data of page 40 in which text area 45 is selected. Accordingly, temporary buffer 95 is created having dimensions equal to the dimensions of text block 77. Next, white pixels of decomposed rectangle 77a are analyzed according to step S1808. In particular, for each white pixel in decomposed rectangle 77a of the binarized image data, a correspondingly-located pixel is identified in temporary buffer 95. The value of the correspondingly-located pixel in temporary buffer 95 is then assigned to a pixel in rendering buffer 80 at a position corresponding to the position of the identified white pixel in the binarized image data. This process is repeated for decomposed rectangles 77b and 77c. As a result, a background pattern can be added to a selected object without obscuring or altering the selected object.

In an alternative embodiment, step S1805 of FIG. 18 is omitted. Accordingly, in step S1808, no temporary buffer is used to determine the values to assign to the pixels of rendering buffer. Instead, the selected pattern is analyzed in real time to calculate the values to assign pixels of the rendering buffer corresponding to the white pixels of the binarized image data.

Figure 20:
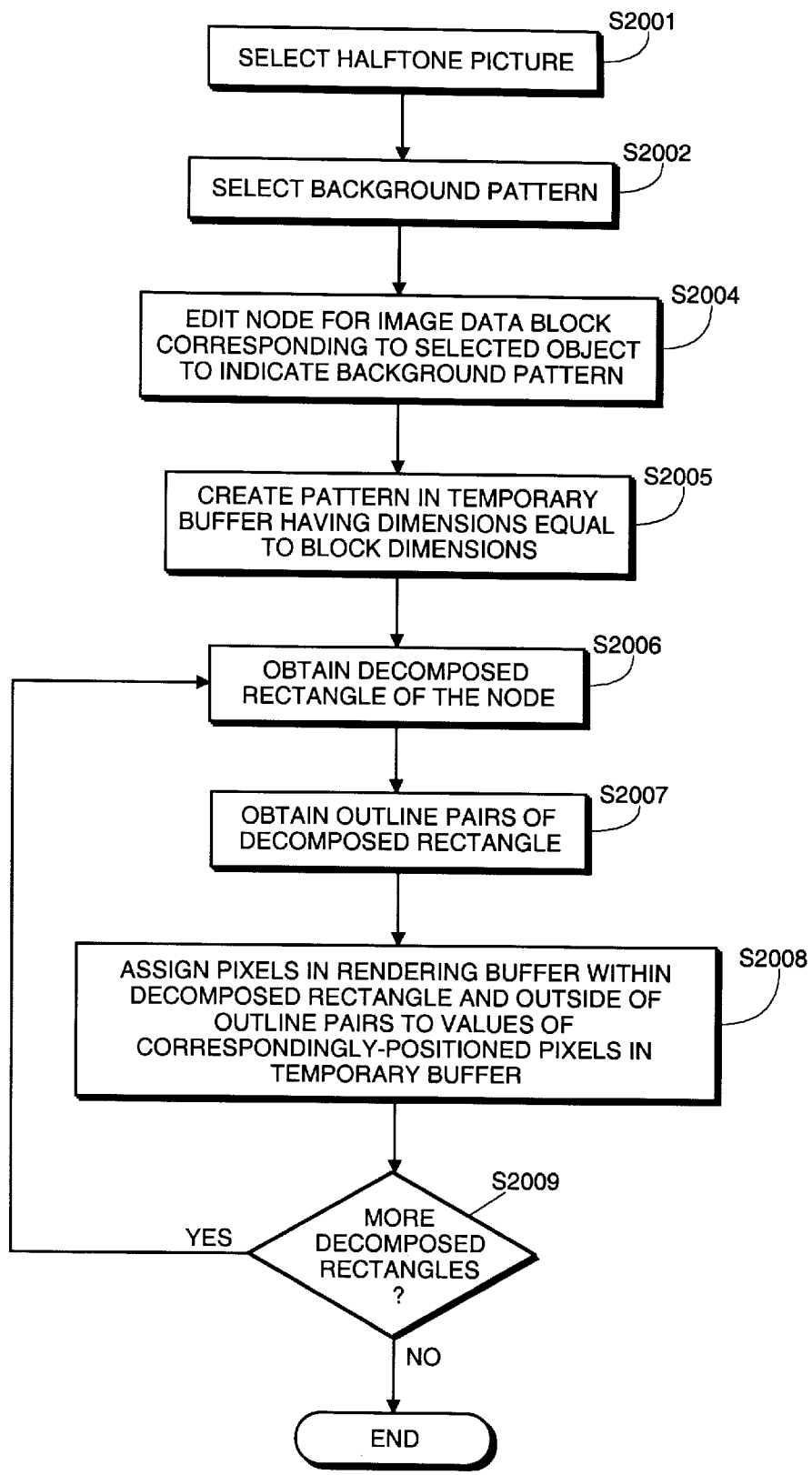
FIG. 20 is a flow diagram of computer-executable process steps to edit a background pattern according to the present invention.

FIG. 20 is a flow diagram of process steps to edit a background pattern of a halftone picture according to the present invention. A halftone picture and a background pattern are selected in step S2001 and step S2002, respectively. Steps S2004, S2005 and S2006 proceed similarly to steps S1804, S1805 and S1806 of FIG. 18 and descriptions thereof are omitted for the sake of brevity. Next, in step S2007, outline pairs of the decomposed rectangle are obtained. In step S2008, pixels in the rendering buffer which are within the decomposed rectangle and outside of the obtained outline pairs are assigned to the values of correspondingly-positioned pixels in the temporary buffer. It is then determined, in step S2009, whether more decomposed rectangles exist in the node. If so, flow returns to step S2006. If not, flow terminates.

FIG. 21 shows temporary buffer 100 created in a case that halftone picture 47 is selected in step S2001. As such, temporary buffer 100 has dimensions equal to the block containing picture 47. Moreover, in accordance with step S2008, each pixel within the block and outside of outline pairs obtained from the picture node is assigned a value of a correspondingly-positioned pixel in temporary buffer 100.

In an alternative embodiment of the FIG. 20 process steps, step S2005 is omitted. Consequently, according to this embodiment, no temporary buffer is used in step S2008 to determine the values to assign to the pixels of rendering buffer. Instead, the selected background pattern is analyzed in real time to calculate the values to assign pixels of the rendering buffer outside of the outline pairs.

Figure 22:
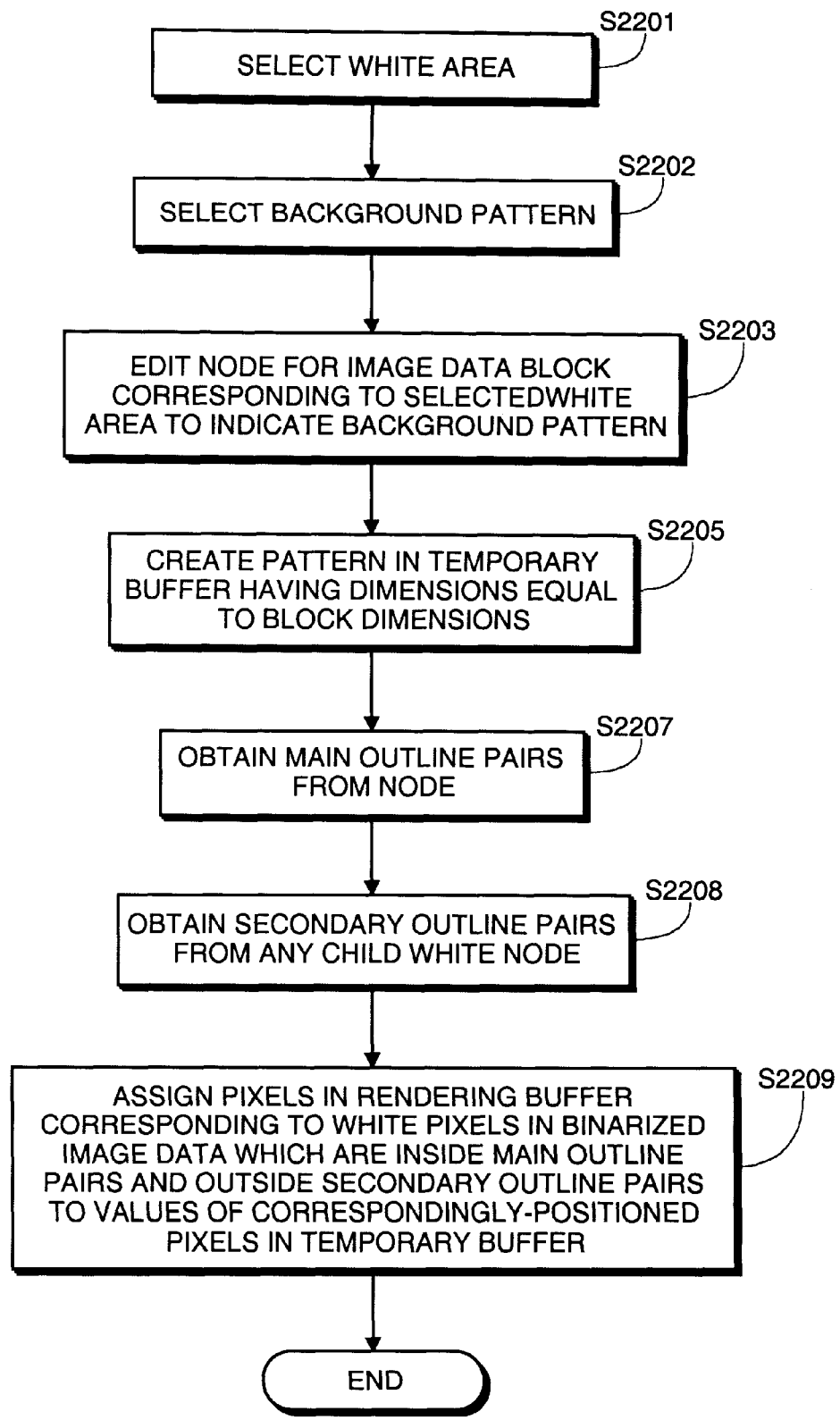
FIG. 22 is a flow diagram of computer-executable process steps to edit a background pattern according to the present invention.

FIG. 22 is a flow diagram of process steps to edit a background pattern of a selected white area. Flow begins at step S2201, in which a white area is selected. In step S2202, a background pattern is also selected. Next, in step S2203, a node of an image data block corresponding to the selected white area is edited to indicate the selected background pattern. The selected pattern is created in step S2205 in a temporary buffer having dimensions equal to the image data block dimensions. In steps S2207 and S2208, main outline pairs and secondary outline pairs, as described above with respect to FIG. 13, are obtained from the node. Finally, in step S2209, pixels in the rendering buffer corresponding to white pixels in the binarized image data which are inside of the block and outside the white outline pairs are assigned values of correspondingly-positioned pixels in the temporary buffer.

Figure 23:
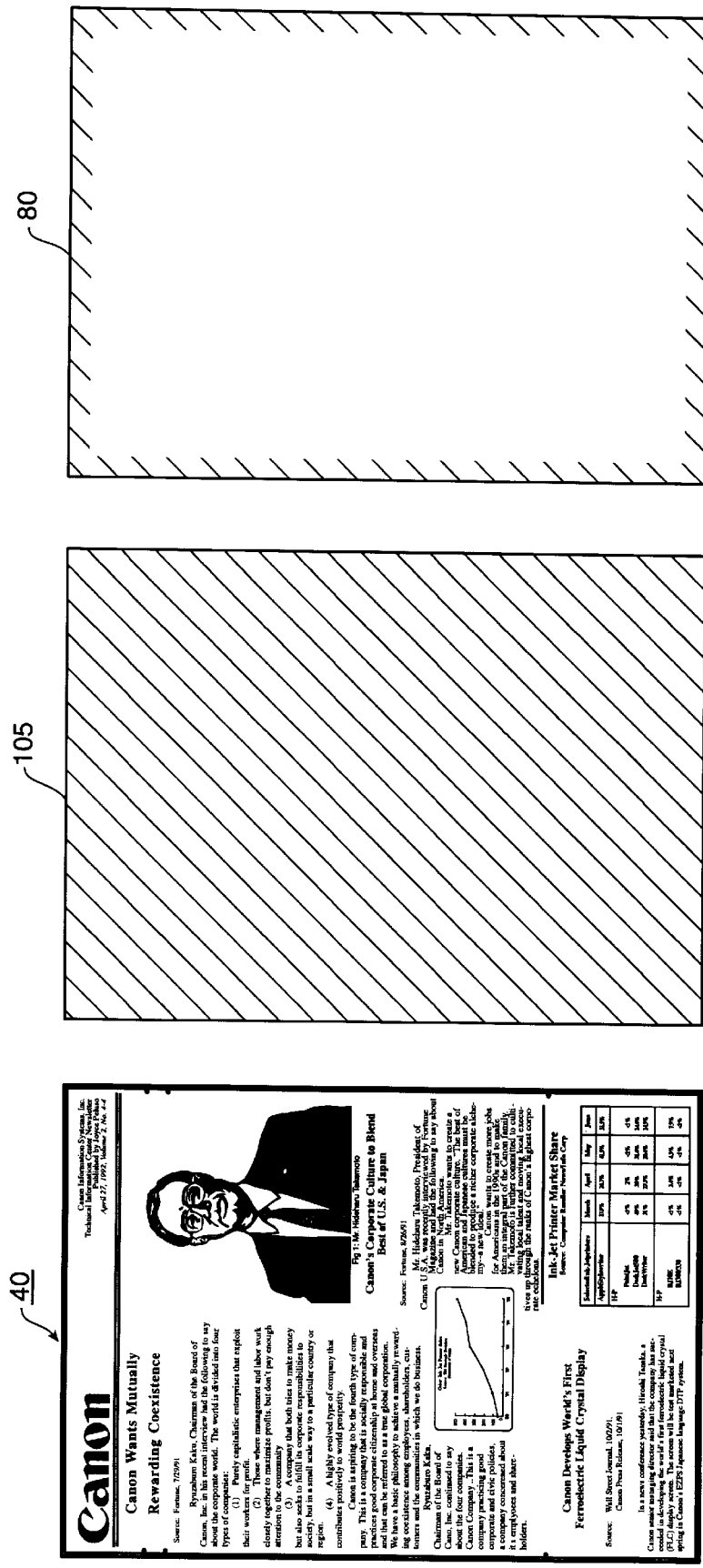
FIG. 23 is a view illustrating several of the FIG. 22 process steps.

FIG. 23 illustrates the FIG. 22 process steps. In particular, the white area corresponding to node 65 of hierarchical tree structure 50 is selected in step S2201 and a pattern is created in temporary buffer 105 as described above with respect to FIG. 14. FIG. 23 also shows binarized image data of page 40 including main outline pairs and secondary outline pairs. In step S2209, after identifying those white pixels of the binarized image data which are inside the main outline pairs and outside the secondary white outline pairs, pixels of rendering buffer 80 having corresponding locations are assigned values of pixels having corresponding locations in temporary buffer 105.

In an alternative embodiment, step S2205 is omitted. Therefore, no temporary buffer is used in step S2209 to determine the values to assign to the pixels of rendering buffer. Instead, in step S2209, the selected background pattern is analyzed in real time to calculate the values to assign pixels of the rendering buffer corresponding to white pixels of the binarized image data which are inside main outline pairs and outside secondary outline pairs.

FIG. 24A is a flow diagram of computer-executable process steps to substitute a solid line for a dotted line pattern. Accordingly, in step S2401, a solid line is selected. Next, in step S2402, a dotted line pattern is selected. A node of an image data block including the selected solid line is edited in step S2404 to indicate the selected dotted line pattern. Such editing includes editing of each decomposed rectangle in the node to indicate the selected dotted line pattern. Next, in step S2405, a linear buffer of pixels having equal width (length) to the selected horizontal (vertical) solid line is allocated so as to reflect the selected pattern.

In a case that the background information of the edited node indicates a background color, as opposed to a background pattern, flow proceeds from step S2406 to step S2407. In step S2407, a decomposed rectangle of the edited node is obtained. In step S2408 and step S2409, a foreground color and a background color of the decomposed rectangle are determined, receptively. In step S2410, the binarized image data is examined to locate black pixel positions within the decomposed rectangle. Next, in step S2411, a pixel in the rendering area corresponding to a located black pixel position is assigned the foreground color if a corresponding pixel in the linear buffer is black, and is assigned the background color if a corresponding pixel in the linear buffer is white. It is then determined, in step S2412, whether more decomposed rectangle exists in the node. If so, flow returns to step S2407. If not, flow terminates.

Figure 25:
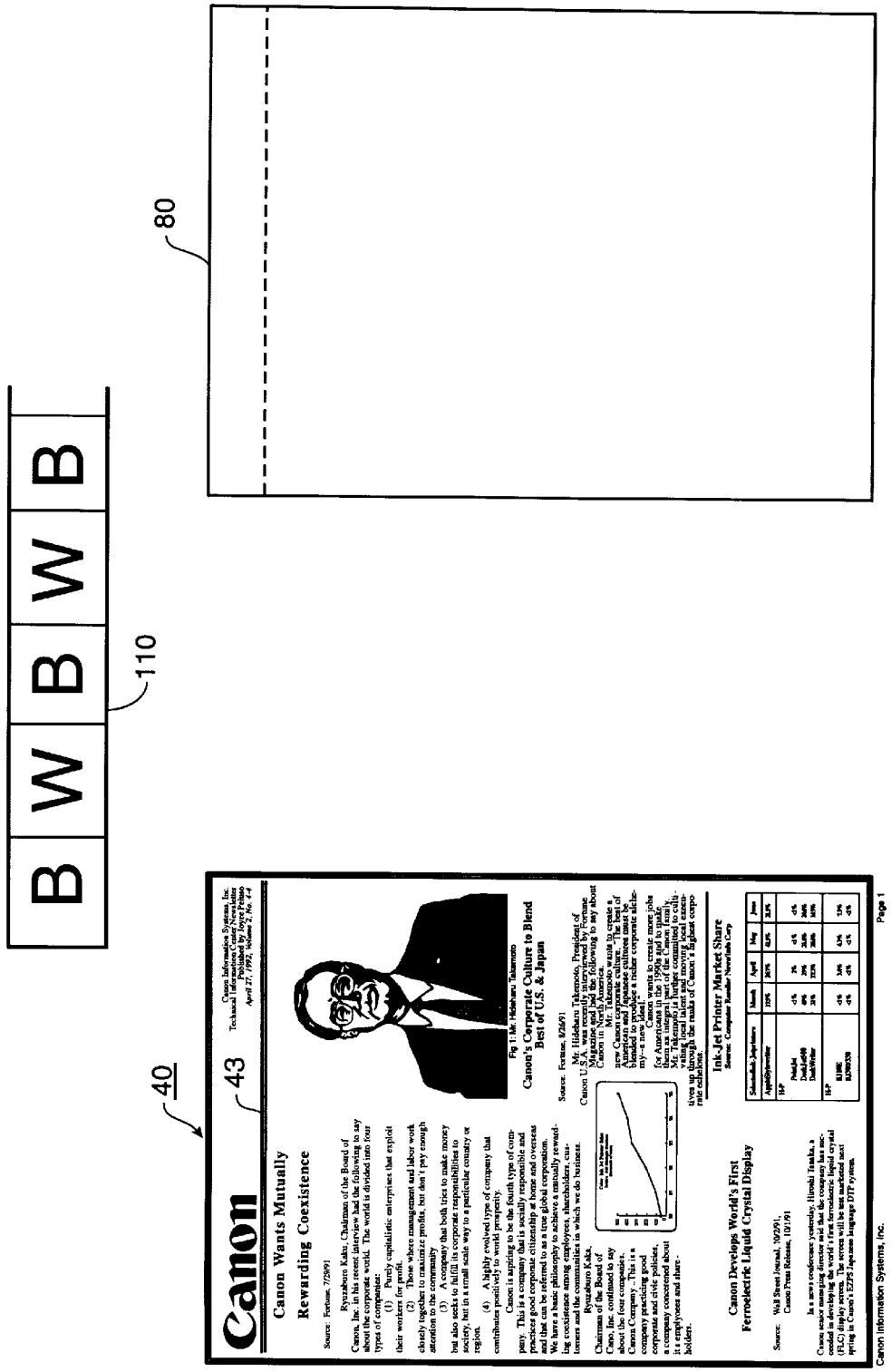
FIG. 25 is a view illustrating several of the FIG. 24 process steps.

FIG. 25 shows linear buffer 110 allocated in step S2405. As shown FIG. 25, solid line 43 has been selected from the binarized image data of page 40. Accordingly, for each black pixel of solid line 43, a correspondingly-located pixel of buffer 110 is examined. If the correspondingly-located pixel in buffer 110 is a black pixel, a pixel at a similarly-corresponding location of rendering buffer 80 is assigned the determined foreground color. If, on the other hand, a correspondingly-located pixel of buffer 110 is a white pixel, a pixel at a similarly corresponding location of rendering buffer 80 is assigned the background color. As a result, a style of a solid line can be edited without changing relative foreground and background color schemes.

Figure 24B:
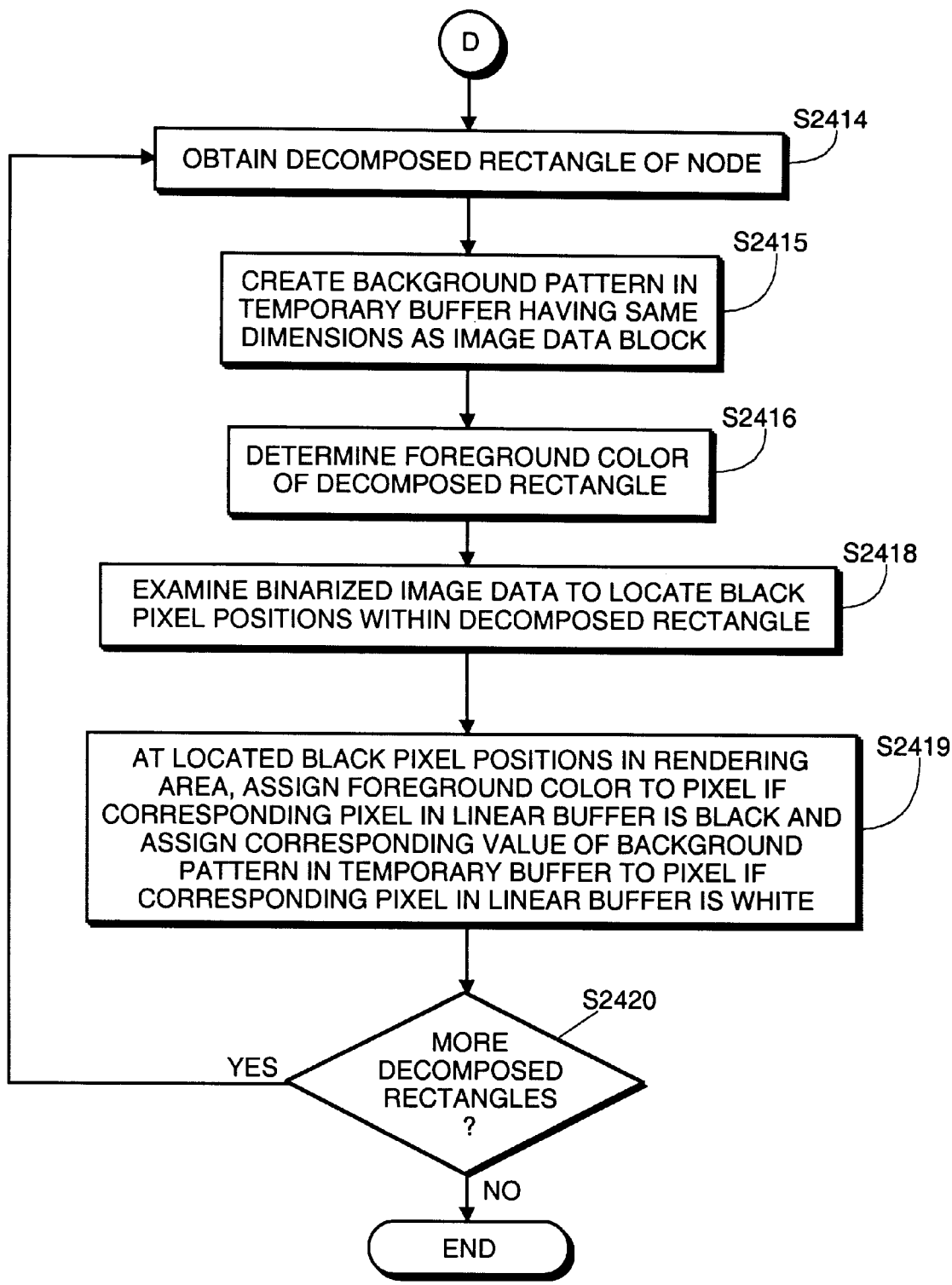

Returning to the FIG. 24A process steps, if, in step S2406, the background information of the edited node indicates a background pattern, flow proceeds to step S2414 of FIG. 24B. In step S2414, a decomposed rectangle of the node is obtained. Next, in step S2415, the background pattern indicated by the edited node is created in a temporary buffer having dimensions equal to those of the image data block including the selected solid line.

In step S2416, the foreground color of the obtained decomposed rectangle is determined. Then, in step S2418, the stored binarized image data is examined to locate black pixel positions within the decomposed rectangle. Appropriate values are assigned to pixels of the rendering buffer in step S2419.

Specifically, the determined foreground color is assigned to pixels of the rendering buffer at the located black pixel positions if correspondingly-located pixels of the linear buffer are black. For correspondingly-located pixels of the linear buffer which are white, the pixels of the rendering buffer at the black pixel locations are assigned a same value as that of correspondingly-located pixels in the background pattern temporary buffer. If additional decomposed rectangles exist in the node, flow returns to step S2414. If not, flow terminates.

It should be noted that it is not absolutely necessary to create the linear and/or temporary buffers of steps S2405 and S2415. Instead, steps S2411 and S2419 can be performed in real time by calculating appropriate pixel value assignments based on the desired outcome apparent from the above description of steps S2411 and S2419.

Figure 26:
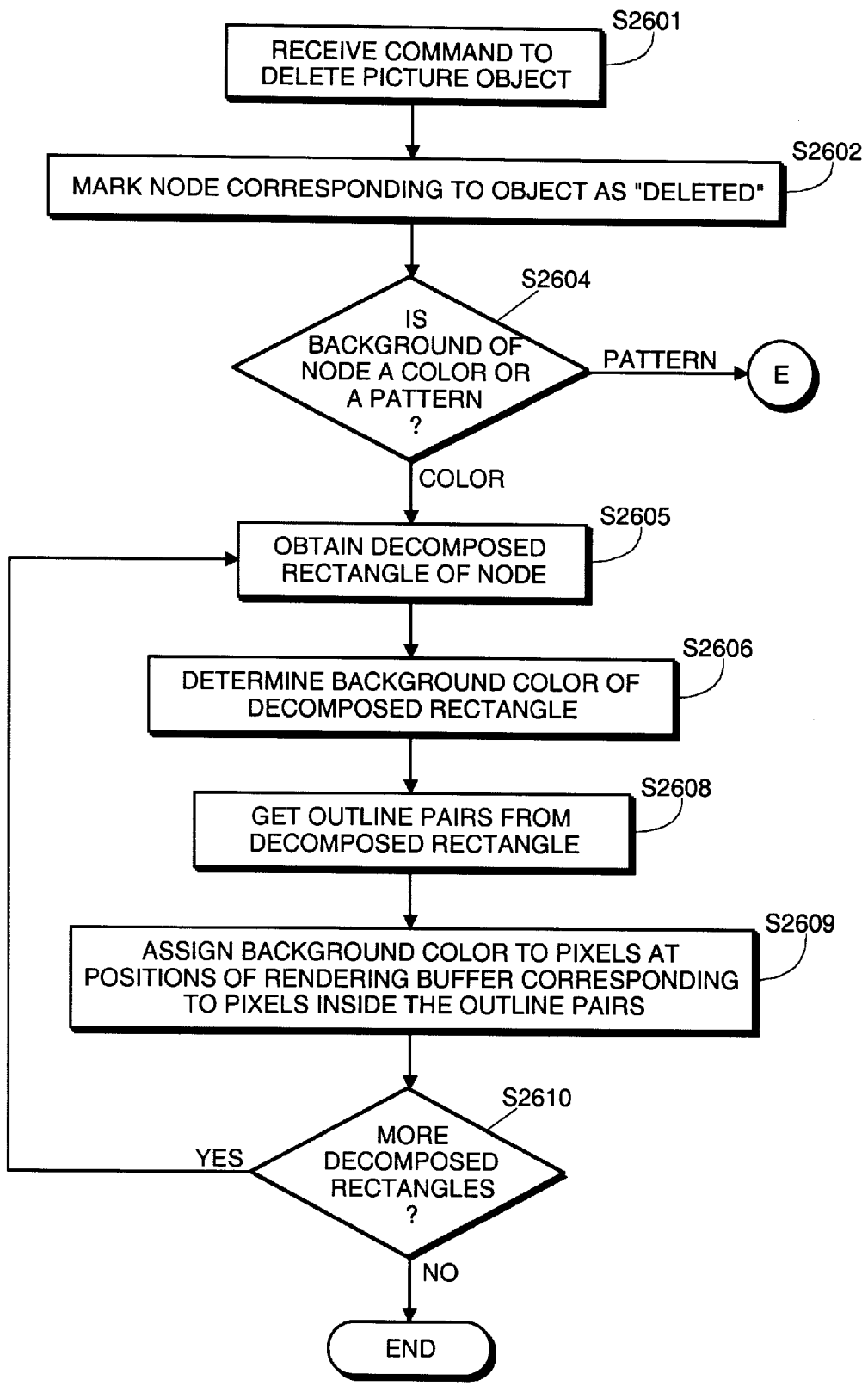
FIG. 26 is a flow diagram of computer-executable process steps to delete a picture object according to the present invention.

FIG. 26 is a diagram of computer-executable process steps to delete a picture object within a page of image data. Initially, a command is received in step S2601 to delete a picture object. In step S2602, a node corresponding to the object is marked "deleted". Next, in step S2604, it is determined whether a background of the node is a color or a pattern. If a color, flow proceeds to step S2605, in which a decomposed rectangle of the node is obtained. In step S2606, a background color of the decomposed rectangle is determined as described above. Next, in step S2608, outline pair data within the decomposed rectangle are identified, the outline pair data indicating locations of data for the picture object. In step S2609, pixels at positions of a rendering buffer corresponding to the identified pixel locations within the outline pairs are assigned the determined background color. If more decomposed rectangles are determined to exist in the node in step S2610, flow returns to step S2605. If no more decomposed rectangles exist, flow terminates.

Figure 27:
FIG. 27 is a view illustrating several of the FIG. 26 process steps.

FIG. 27 illustrates steps to delete a picture object as set forth in FIG. 26. As shown, a background of picture 47 in page 40 is a colored background. Accordingly, for each pixel location in the binarized image of page 40 which is within the outline pairs corresponding to picture 47, a corresponding pixel of rendering buffer 80 is assigned the background color. Resulting rendering buffer 80 is also shown in FIG. 27.

Figure 28:
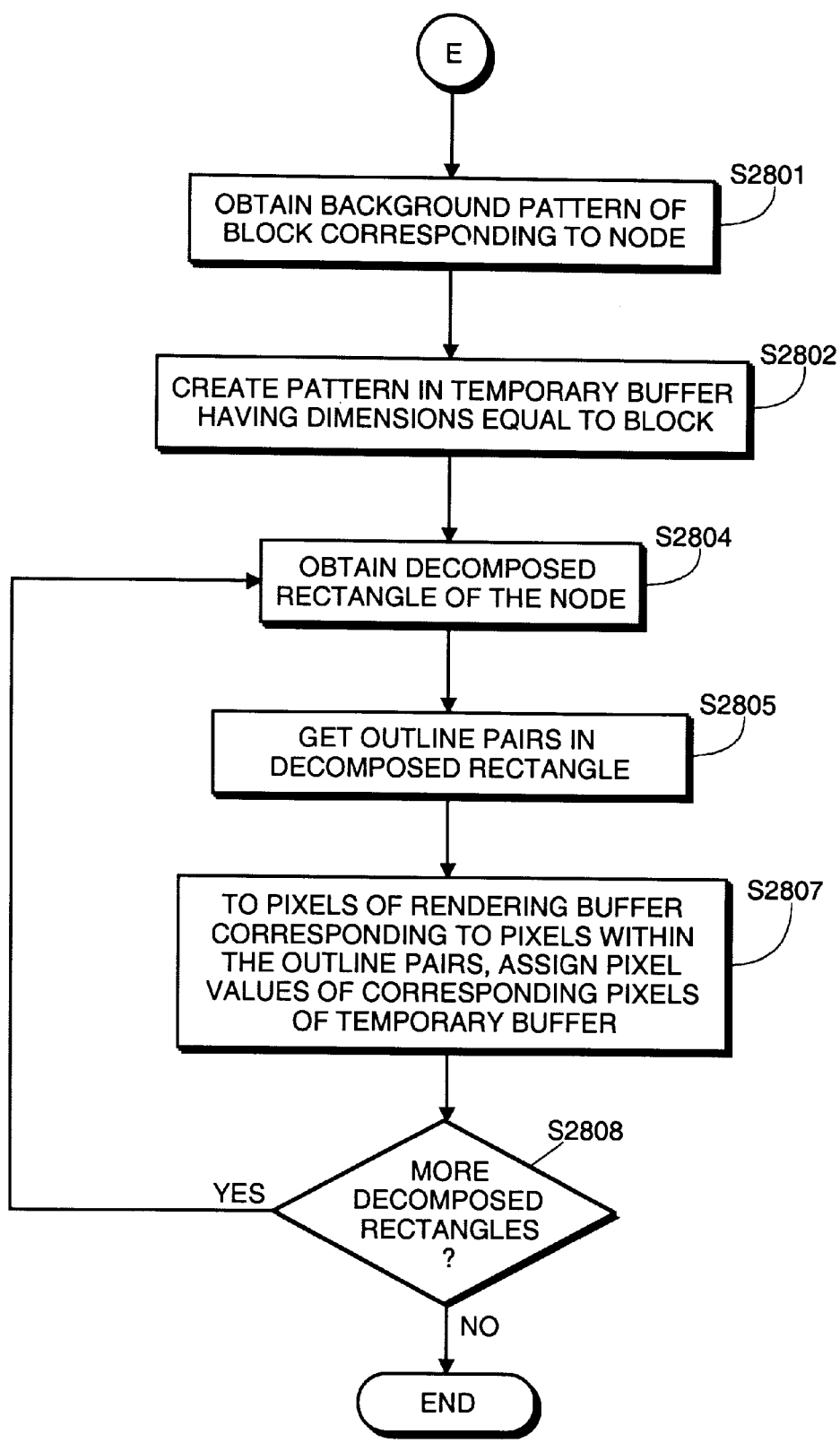
FIG. 28 is a flow diagram of computer-executable process steps to delete a picture object according to the present invention.

If, in step S2604, it is determined that the background of the selected picture object is a pattern, flow proceeds to step S2801 of FIG. 28. In step S2801, the background pattern is obtained from the node corresponding to the selected picture object. Next, in step S2802, the pattern is created in a temporary buffer having equal dimensions to those of the block represented by the node. A decomposed rectangle of the block is obtained in step S2804, and outline pairs which are within the decomposed rectangle are identified in step S2805.

Thereafter, in step S2807, pixels of the rendering buffer which correspond to pixel locations within the outline pairs are assigned values of pixels of the temporary buffer which also correspond to the pixel locations. If more decomposed rectangles are present in the node, flow proceeds from step S2808 to step S2804. If not, flow terminates after step S2808.

In an alternative embodiment of FIG. 28, step S2802 is omitted. Therefore, no temporary buffer is used in step S2807 to determine the values to assign to the pixels of rendering buffer. Instead, in step S2807, the background pattern is analyzed in real time to calculate the values to assign pixels of the rendering buffer within the outline pairs.

FIG. 29 shows rendering buffer 80 prior to execution of the FIG. 28 process steps. According to the FIG. 28 steps, buffer 115 is created to correspond to a block containing picture 47. As shown, buffer 115 is filled with a background pattern of picture 47. The right side of FIG. 29 shows rendering buffer 80 after execution of step S2807 as described above.

Figure 30:
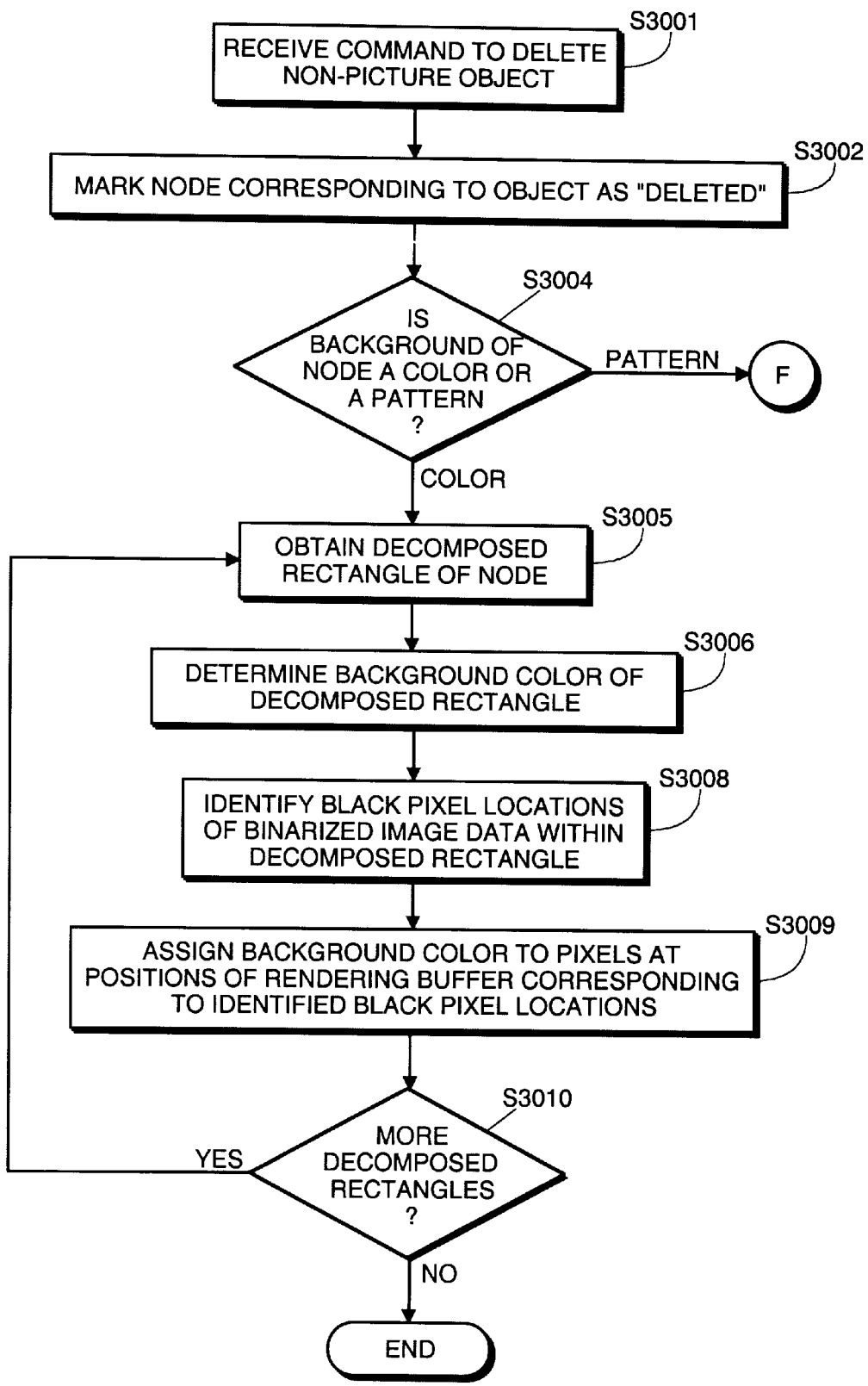
FIG. 30 is a flow diagram of computer-executable process steps to delete a non-picture object according to the present invention.

FIG. 30 is a diagram of computer-executable process steps to delete a non-picture object within a page of image data. Initially, a command is received in step S3001 to delete a non-picture object, such as a text, line, line-art, frame, or table object. In step S3002, a node corresponding to the object is marked "deleted". Next, in step S3004, it is determined whether background information of the node indicates a color or a pattern. If a color, flow proceeds to step S3005, in which a decomposed rectangle of the node is obtained. In step S3006, a background color of the decomposed rectangle is determined as described above.

Next, in step S3008, black pixel locations of binarized image data within the decomposed rectangle are identified. In step S3009, pixels at positions of a rendering buffer corresponding to the identified black pixel locations are assigned the determined background color. If more decomposed rectangles are determined to exist in the node in step S3010, flow returns to step S3005. If no more decomposed rectangles exist, flow terminates.

Figure 31:
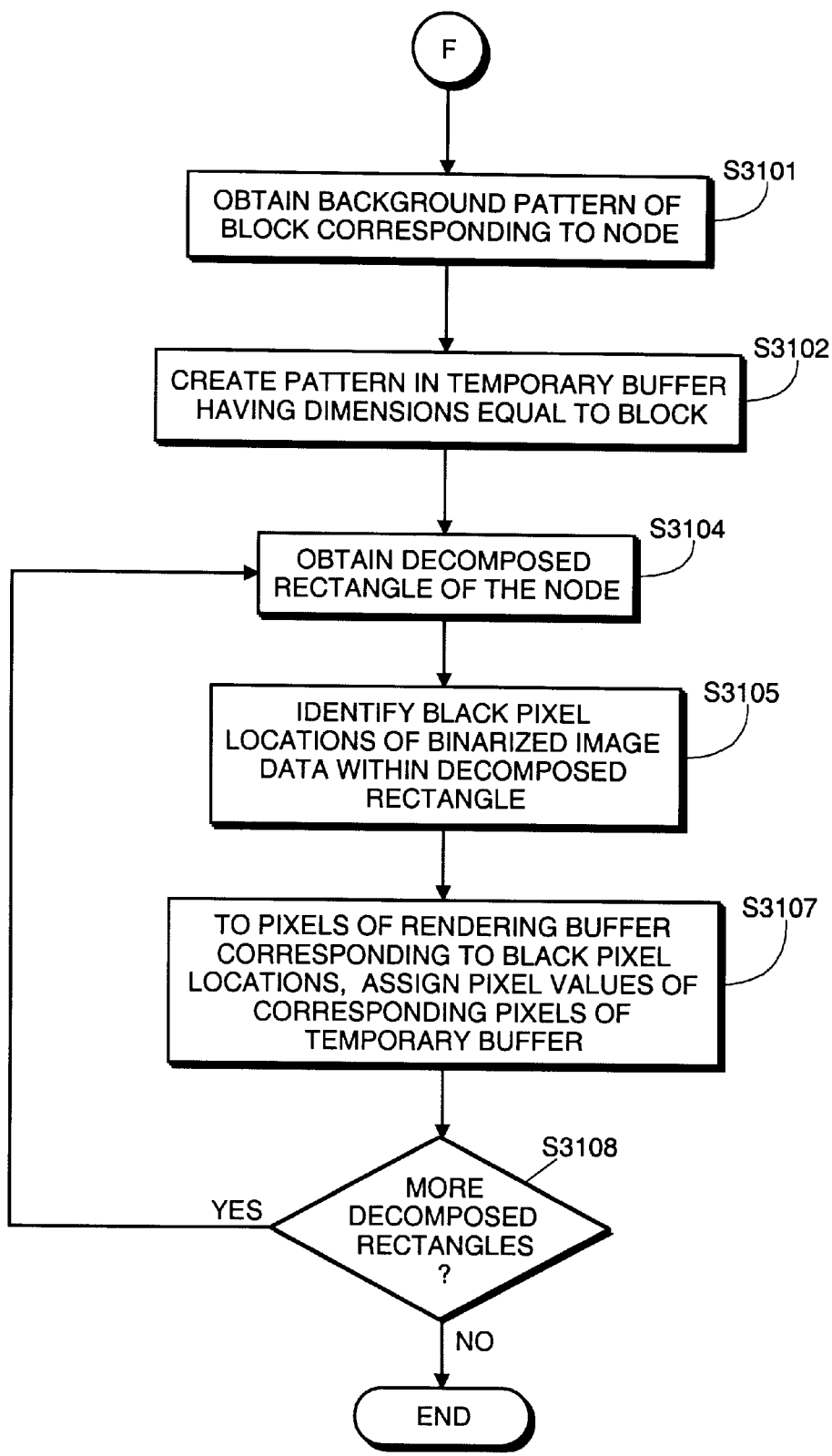
FIG. 31 is a flow diagram of computer-executable process steps to delete a non-picture object according to the present invention.

If, however, in step S3004, it is determined that the background of the selected object is a pattern, flow proceeds to step S3101 of FIG. 31. In step S3101, the background pattern is obtained from the node corresponding to the selected object. Next, in step S3102, the pattern is created in a temporary buffer having equal dimensions to those of the block represented by the node. A decomposed rectangle of the node is obtained in step S3104, and black pixel locations of the binarized image data which are within the decomposed rectangle are identified in step S3105.

Thereafter, in step S3107, pixels of the rendering buffer which correspond to the black pixel locations are assigned values of pixels of the temporary buffer which also correspond to the black pixel locations. If more decomposed rectangles are present in the node, flow proceeds from step S3108 to step S3104. If not, flow terminates after step S3108.

In an alternative embodiment of FIG. 31, step S3102 is omitted. Therefore, no temporary buffer is used in step S3107 to determine the values to assign to the pixels of rendering buffer. Instead, in step S3107, the background pattern is analyzed in real time to calculate the values to assign pixels of the rendering buffer corresponding to black pixel locations within the binarized image data.

Figure 32:
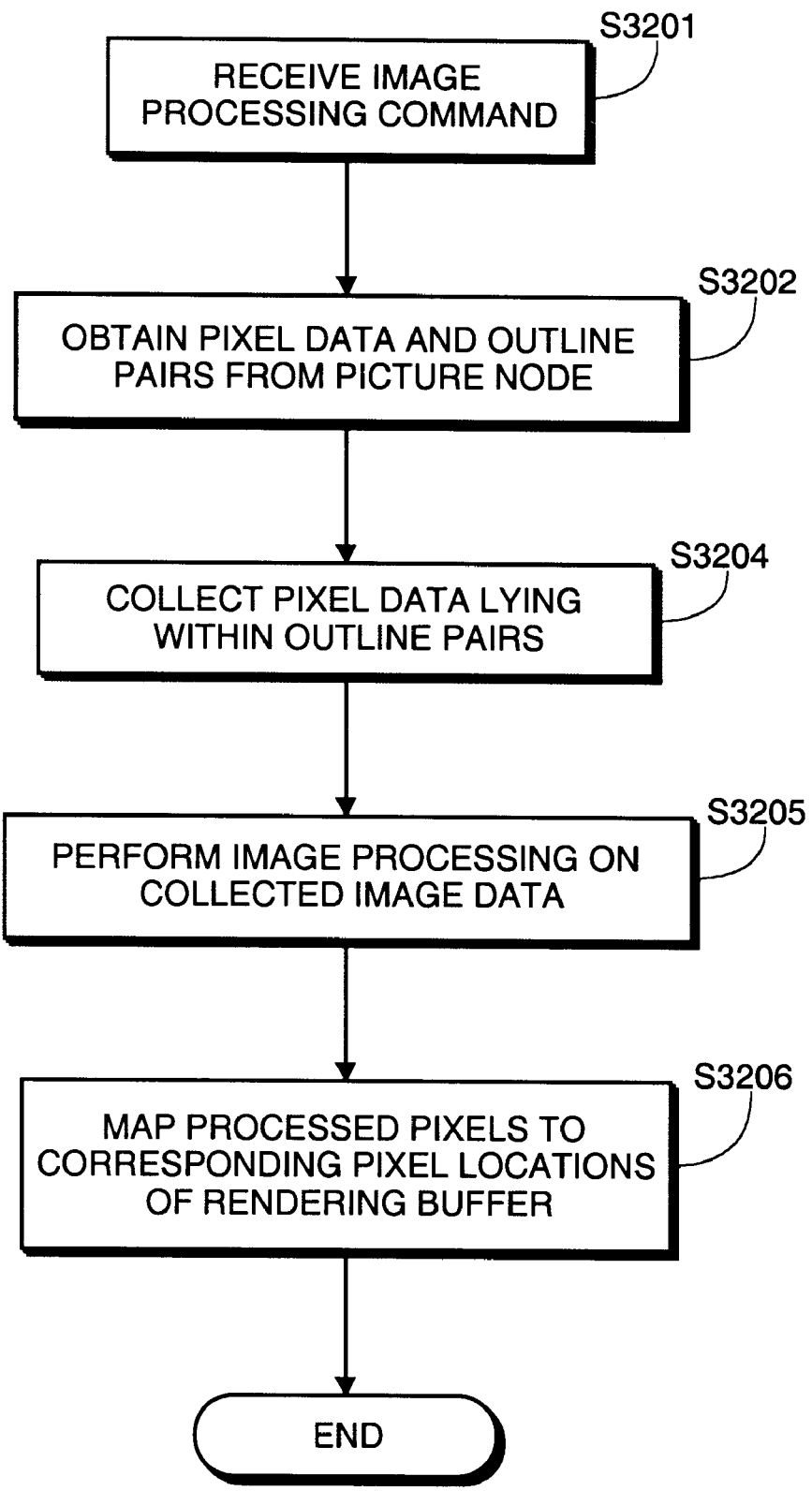
FIG. 32 is a flow diagram of computer-executable process steps to perform image processing on a picture according to the present invention.

FIG. 32 is a flow diagram of computer-executable process steps to process an image according to the present invention. Flow begins at step S3201, in which a command to perform an image processing function on a selected picture is received. In response, pixel data and outline pairs are obtained from a node corresponding to the picture in step S3202. Next, in step S3204, pixel data lying within the outline pairs is collected. Accordingly, the collected pixels consist of the foreground picture pixels, rather than both foreground and background pixels of the picture. In step S3205, the selected processing is performed on the collected data. Finally, in step S3206, the processed pixels are mapped to the rendering buffer in accordance with the obtained outline pairs so as to refill the foreground area of the picture with the processed pixels.

Figure 33:
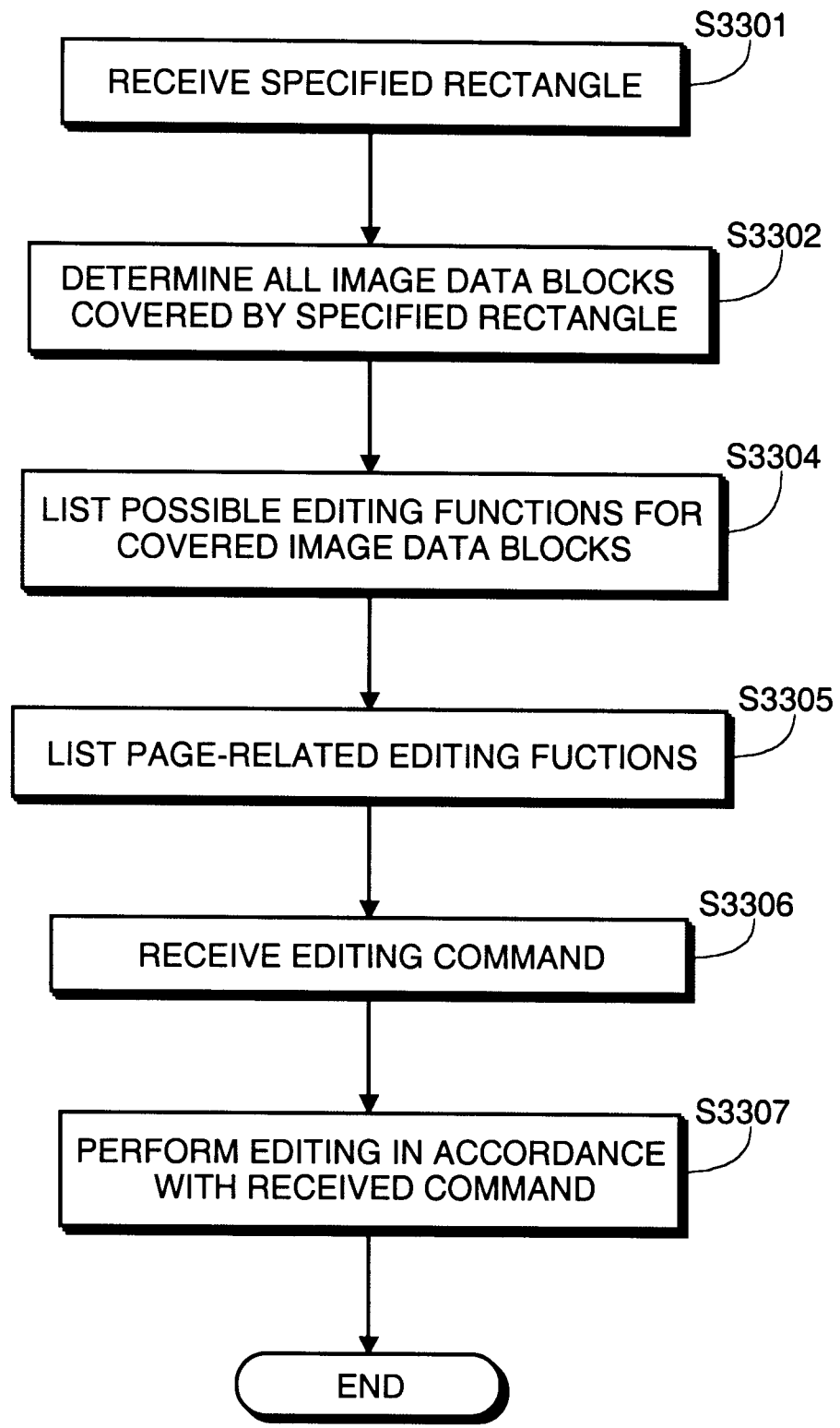
FIG. 33 is a flow diagram of computer-executable process steps to edit a color document according to the present invention.

FIG. 33 is a flow diagram of computer-executable process steps to edit a specific area of a document image according to the present invention. First, in step S3301, a designated rectangular area of a document image is received. All blocks of the document which are overlapped by the rectangle are determined in step S3302. Based on the determined blocks, all available editing functions are indicated to a user in step S3304. Moreover, in step S3305, all functions available to perform on the entire page are indicated. An editing command is then received in step S3306, and editing is performed in step S3307 in accordance with the received command.

Figure 34:
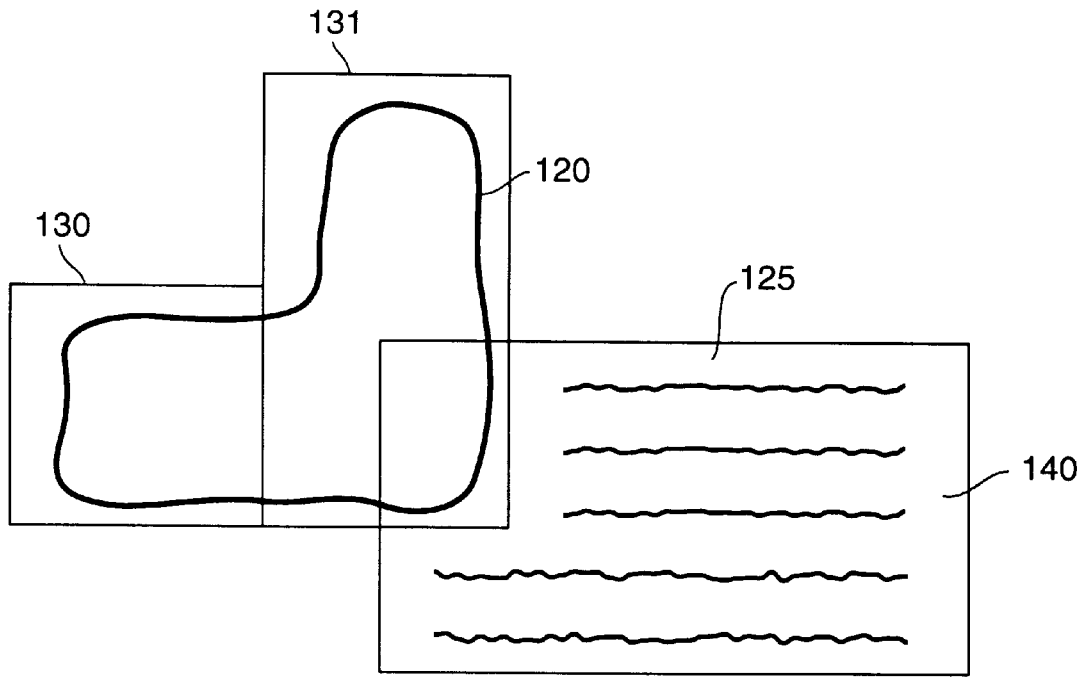
FIG. 34 illustrates area editing according to the present invention.

FIG. 34 illustrates editing according to the present invention. Picture area 120 and text area 125 are shown, with rectangles 130 and 131 being decomposed rectangles representing picture 120. In this regard, rectangles 130 and 131 are not visible to a user, but are shown in FIG. 32 for purposes of illustration.

Surrounding text area 125 is rectangle 140, which has been designated by a user by means of pointing device 6, keyboard 5, or other means. Accordingly, rectangle 140 is visible to the user. As described above, rectangle 140 is designated to indicate a particular area to be edited. For the present example, it is assumed that, after reception of rectangle 140 in step S3301, a command to edit a background color is received in step S3306.

As shown, rectangle 140 contains text area 125 but also overlaps picture 120. Consequently, background color information in a node representing area 125 is edited in step S3307, and information in a node representing picture 120 is also edited. However, since rectangle 140 partially overlaps picture 120, it is necessary to further decompose rectangles 130 and 131 to account for the overlap.

Figure 35:
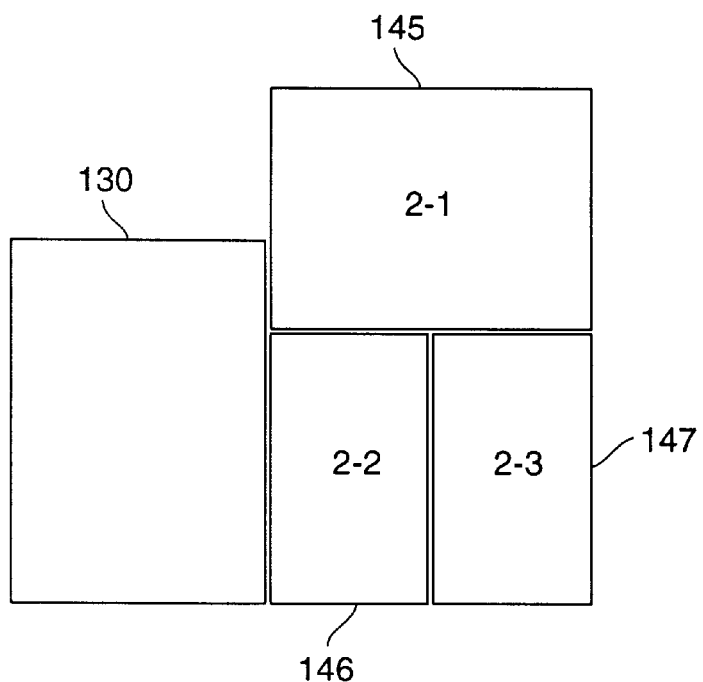
FIG. 35 illustrates rectangle decomposition based on area editing according to the present invention.

FIG. 35 shows decomposed rectangles corresponding to picture 140 after step S3307. In this regard, rectangle 131 has been decomposed into rectangles 145, 146, and 147, which are respectively designated 2-1, 2-2, and 2-3. Background color information corresponding to rectangles 145 and 146 is unchanged due to the received editing command. However, background color information corresponding to rectangle 147 is now in accordance with the received editing command. As a result, after re-rendering the foregoing objects, background colors of text area 125 and rectangle 147 reflect the editing command.

It should be noted that the designations 2-1, 2-2 and 2-3 are maintained in a corresponding hierarchical tree structure. By virtue of this feature, these decomposed rectangles may be recombined into single rectangle 131 if future editing causes their individual attributes to again be identical.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for rendering a color image using a binarized image representing the color image and a hierarchical tree structure representing the color image, the hierarchical tree structure including nodes representing respective blocks of image data within the color image, the nodes containing color information for respective blocks, the method comprising:

defining, in a memory, a color image rendering area corresponding to a block of image data in the color image;

obtaining foreground color information from a node corresponding to the block of image data;

detecting black pixel locations in the binarized image within an area of the binarized image corresponding to the block of image data;

assigning the foreground color to pixels at locations in the color image rendering area corresponding to the detected black pixel locations;

obtaining background color information from the node corresponding to the block of image data; and assigning the background color to pixels at each location in the color image rendering area which does not correspond to the detected black pixel locations.

2. A method according to claim 1, wherein, in a case that the node does not contain foreground color information, foreground color information is obtained in said obtaining step from a parent node of the node.

3. A method according to claim 1, wherein, in a case that the node does not contain background color information, background color information is obtained in said obtaining step from a parent node of the node.

4. A method for editing a color image using a binarized image representing the color image and a hierarchical tree structure representing the color image, the hierarchical tree structure including nodes representing respective blocks of image data within the color image, the nodes containing color information for respective blocks, the method comprising:

selecting a block of image data in the color image;

identifying a node of the hierarchical tree corresponding to the selected block of image data;

editing a foreground color attribute in the identified node;

defining, in a memory, a color image rendering area corresponding to the block of image data in the color image;

obtaining the edited foreground color attribute from the node corresponding to the block of image data;

detecting black pixel locations in the binarized image within an area of the binarized image corresponding to the block of image data;

assigning a foreground color represented by the foreground color attribute to pixels at locations in the color image rendering area corresponding to the detected black pixel locations;

obtaining a background color attribute from the node corresponding to the block of image data; and assigning a background color represented by the attribute to pixels at each location in the color image rendering area which does not correspond to the detected black pixel locations.

5. A method according to claim 4, further comprising:

editing the background color attribute in the node, wherein the edited background color attribute is obtained in the background color attribute obtaining step and assigned to pixels in the background color assigning step.

6. A computer-readable medium storing computer-executable process steps to render a color image using a binarized image representing the color image and a hierarchical tree structure representing the color image, the hierarchical tree structure including nodes representing respective blocks of image data within the color image, the nodes containing color information for respective blocks, the steps comprising:

a defining step to define, in a memory, a color image rendering area corresponding to a block of image data in the color image;

an obtaining step to obtain foreground color information from a node corresponding to the block of image data;

a detecting step to detect black pixel locations in the binarized image within an area of the binarized image corresponding to the block of image data;

an assigning step to assign the foreground color to pixels at locations in the color image rendering area corresponding to the detected black pixel locations;

an obtaining step to obtain background color information from the node corresponding to the block of image data; and an assigning step to assign the background color to pixels at each location in the color image rendering area which does not correspond to the detected black pixel locations.

7. A medium according to claim 6, wherein, in a case that the node does not contain foreground color information, foreground color information is obtained in said obtaining step from a parent node of the node.

8. A medium according to claim 6, wherein, in a case that the node does not contain background color information, background color information is obtained in said obtaining step from a parent node of the node.

9. A computer-readable medium storing computer-executable process steps to edit a color image using a binarized image representing the color image and a hierarchical tree structure representing the color image, the hierarchical tree structure including nodes representing respective blocks of image data within the color image, the nodes containing color information for respective blocks, the steps comprising:

a selecting step to select a block of image data in the color image;

an identifying step to identify a node of the hierarchical tree corresponding to the selected block of image data;

an editing step to edit foreground color attribute in the identified node;

a defining step to define, in a memory, a color image rendering area corresponding to the block of image data in the color image;

an obtaining step to obtain the edited foreground color attribute from the node corresponding to the block of image data;

a detecting step to detect black pixel locations in the binarized image within an area of the binarized image corresponding to the block of image data;

an assigning step to assign a foreground color represented by the foreground color attribute to pixels at locations in the color image rendering area corresponding to the detected black pixel locations;

an obtaining step to obtain a background color attribute from the node corresponding to the block of image data; and an assigning step to assign a background color represented by the attribute to pixels at each location in the color image rendering area which does not correspond to the detected black pixel locations.

10. A medium according to claim 9, the steps further comprising:

an editing step to edit a background color attribute in the node, wherein the edited background color attribute is obtained in the step of obtaining the background color attribute and assigned to pixels in the step of assigning background color.

* * * * *

UNITED STATES PATENT AND TRADEMARK OFFICE
CERTIFICATE OF CORRECTION

PATENT NO.    : 6,496,198 B1                                                      Page 1 of 1
DATED         : December 17, 2002
INVENTOR(S)   : Shin-Ywan Wang It is certified that error appears in the above-identified patent and that said Letters Patent is hereby corrected as shown below:

Column 1,
Line 23, "Are." should read -- Are --.

Column 11,
Line 27, "S130S," should read -- S1305, --.

Signed and Sealed this

Fifteenth Day of July, 2003

JAMES E. ROGAN
*Director of the United States Patent and Trademark Office*